(12) United States Patent
Seo

(10) Patent No.: US 10,869,297 B2
(45) Date of Patent: Dec. 15, 2020

(54) METHOD FOR TRANSMITTING SIGNAL BETWEEN TERMINALS, AND APPARATUS FOR SAME

(71) Applicant: LG ELECTRONICS INC., Seoul (KR)

(72) Inventor: Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/740,311

(22) PCT Filed: Jul. 1, 2016

(86) PCT No.: PCT/KR2016/007116
§ 371 (c)(1),
(2) Date: Dec. 27, 2017

(87) PCT Pub. No.: WO2017/007184
PCT Pub. Date: Jan. 12, 2017

(65) Prior Publication Data
US 2018/0192397 A1    Jul. 5, 2018

Related U.S. Application Data

(60) Provisional application No. 62/188,492, filed on Jul. 3, 2015.

(51) Int. Cl.
*H04W 72/02* (2009.01)
*H04W 72/04* (2009.01)
(Continued)

(52) U.S. Cl.
CPC .......... *H04W 72/02* (2013.01); *H04L 5/0007* (2013.01); *H04L 5/0044* (2013.01);
(Continued)

(58) Field of Classification Search
CPC .. H04W 72/02; H04W 72/04; H04L 27/0006; H04L 5/0051; H04L 5/0044; H04L 5/0055; H04L 5/0007
See application file for complete search history.

(56) References Cited

U.S. PATENT DOCUMENTS

2012/0250656 A1    10/2012  Noh et al.
2012/0300662 A1    11/2012  Wang et al.
(Continued)

FOREIGN PATENT DOCUMENTS

JP    2012517784    8/2012
JP    2015012591    1/2015
(Continued)

OTHER PUBLICATIONS

Huawei, et al., "Mode 2 resource allocation for D2D", 3GPP TSG RAN WG1 Meeting #78, R1-142839, Aug. 2014, 6 pages.
(Continued)

*Primary Examiner* — Thinh D Tran
(74) *Attorney, Agent, or Firm* — Lee Hong Degerman Kang Waimey

(57) ABSTRACT

The present invention provides a method for transmitting a signal between terminals, and an apparatus for the same. Specifically, a first terminal performs resource sensing within a resource search section including a plurality of resource units. The first terminal selects a specific resource unit for transmitting the signal on the basis of the result of the resource sensing, and transmits the signal via the specific resource unit by means of a first reference signal sequence. The specific resource unit is a resource occupied by a second terminal, and the first reference signal sequence may be determined on the basis of a second reference signal sequence of the second terminal.

10 Claims, 17 Drawing Sheets

(51) Int. Cl.
*H04L 5/00* (2006.01)
*H04L 27/00* (2006.01)

(52) U.S. Cl.
CPC .......... *H04L 5/0051* (2013.01); *H04L 5/0055* (2013.01); *H04L 27/0006* (2013.01); *H04W 72/04* (2013.01)

(56) References Cited

U.S. PATENT DOCUMENTS

| | | | | |
|---|---|---|---|---|
| 2014/0056220 A1* | 2/2014 | Poitau | ................... | H04W 76/14 370/328 |
| 2014/0307642 A1 | 10/2014 | Wanstedt et al. | | |
| 2014/0324974 A1 | 10/2014 | Park et al. | | |
| 2014/0328306 A1 | 11/2014 | Gao et al. | | |
| 2015/0215763 A1* | 7/2015 | Ro | ........................ | H04W 8/005 455/426.1 |
| 2015/0264551 A1* | 9/2015 | Ko | ........................ | H04W 76/14 370/329 |
| 2015/0326362 A1* | 11/2015 | Xiong | ................... | H04W 8/005 370/336 |
| 2016/0227493 A1* | 8/2016 | Kwak | ................... | H04W 52/50 |

FOREIGN PATENT DOCUMENTS

| | | |
|---|---|---|
| KR | 1020140147662 | 12/2014 |
| KR | 1020150053686 | 5/2015 |
| WO | 2014010956 | 1/2014 |
| WO | 2014157911 | 10/2014 |
| WO | 2014017498 | 7/2016 |

OTHER PUBLICATIONS

LG Electronics, "Discussion on D2D Discovery Physical Layer Design", 3GPP TSG RAN WG1 Meeting #76bis, R1-141738, Apr. 2014, 10 pages.
PCT International Application No. PCT/KR2016/007116, Written Opinion of the International Searching Authority dated Oct. 6, 2016, 15 pages.
European Patent Office Application Serial No. 16821590.3, Search Report dated Jan. 24, 2019, 8 pages.
LG Electronics, "Discussion on Resource Allocation in D2D Communications", 3GPP TSG RAN WG1 Meeting #75, R1-135481, Nov. 2013, 15 pages.
LG Electronics, "Medium Access for D2D Communications", 3GPP TSG RAN WG2 Meeting #84, R2-134426, Nov. 2013, 9 pages.
ETRI, "Discussion of sensing algorithms for mode 2 resource selection", 3GPP TSG RAN WG1 Meeting #78, R1-143051, Aug. 2014, 5 pages.
Japan Patent Office Application No. 2017-567642, Final Office Action dated Oct. 1, 2019, 4 pages.
European Patent Office Application Serial No. 16821590.3, Office Action dated Nov. 25, 2019, 6 pages.

* cited by examiner

PUCCH format 1a/1b structure (normal CP)

PUCCH format 1a/1b structure (extended CP)

PUCCH format 2/2a/2b structure (normal CP)

PUCCH format 2/2a/2b structure (extended CP)

(a)

(b)

METHOD FOR TRANSMITTING SIGNAL BETWEEN TERMINALS, AND APPARATUS FOR SAME

CROSS-REFERENCE TO RELATED APPLICATIONS

This application is the National Stage filing under 35 U.S.C. 371 of International Application No. PCT/KR2016/007116, filed on Jul. 1, 2016, which claims the benefit of U.S. Provisional Application No. 62/188,492, filed on Jul. 3, 2015, the contents of which are all hereby incorporated by reference herein in their entirety.

TECHNICAL FIELD

The present invention relates to a wireless communication system, and more particularly, to a method of configuring a resource for transmitting a signal between terminals and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed. In addition, a communication environment has evolved into increasing density of nodes accessible by a user at the periphery of the nodes. A node refers to a fixed point capable of transmitting/receiving a radio signal to/from a user equipment through one or more antennas. A communication system including high-density nodes may provide a better communication service to the user through cooperation between the nodes.

Such a multi-node cooperative communication scheme in which a plurality of nodes performs communication with the UE using the same time-frequency resource has much better data throughput than a conventional communication scheme in which the nodes perform communication with the UE without any cooperation by operating as independent eNBs.

A multi-node system performs cooperative communication using a plurality of nodes, each node operating as an eNB, an access point, an antenna, an antenna group, a radio remote header (RRH), or a radio remote unit (RRU). Unlike a conventional centralized antenna system in which antennas converge upon an eNB, the nodes are typically separated from each other by a predetermined interval or more in the multi-node system. The nodes may be managed by one or more eNBs or eNB controllers for controlling the operation thereof or scheduling data transmission/reception therethrough. Each node is connected to the eNB or eNB controller for managing the node through a cable or a dedicated line.

Such a multi-node system may be regarded as a type of MIMO system in that distributed nodes are capable of communicating with a single or multiple UEs by simultaneously transmitting/receiving different streams. However, since the multi-node system transmits signals using nodes distributed at various locations, a transmission region which should be covered by each antenna decreases in comparison with antennas included in the conventional centralized antenna system. Accordingly, compared with a conventional system implementing MIMO technology in the centralized antenna system, a transmit power needed when each antenna transmits a signal may be reduced in the multi-node system. In addition, since the transmission distance between an antenna and a UE is shortened, path loss is reduced and high-speed data transmission is achieved. Therefore, transmission capacity and power efficiency of a cellular system can be enhanced and relatively uniform quality of communication performance can be satisfied irrespective of the locations of UEs in a cell. Furthermore, in the multi-node system, since an eNB(s) or eNB controller(s) connected to multiple nodes performs cooperative data transmission/reception, signal loss generated in a transmission process is reduced. In addition, when nodes distant from each other by a predetermined distance or more perform cooperative communication with the UE, correlation and interference between antennas are reduced. Hence, according to the multi-node cooperative communication scheme, a high signal to interference-plus-noise ratio (SINR) can be achieved.

Due to such advantages of the multi-node system, in the next-generation mobile communication system, the multi-node system has emerged as a new basis of cellular communication through combination with or by replacing conventional centralized antenna systems in order to reduce additional installation costs of an eNB and maintenance costs of a backhaul network and simultaneously to expand service coverage and enhance channel capacity and SINR.

DISCLOSURE OF THE INVENTION

Technical Task

An object of the present invention is to provide a method of configuring a resource for transmitting a signal between terminals and an apparatus therefor.

The technical objects that can be achieved through the present invention are not limited to what has been particularly described hereinabove and other technical objects not described herein will be more clearly understood by persons skilled in the art from the following detailed description.

Technical Solution

To achieve these and other advantages and in accordance with the purpose of the present invention, as embodied and broadly described, according to one embodiment, a method of transmitting a signal, which is transmitted by a first UE (user equipment) between UEs in a wireless communication system, includes the steps of performing resource sensing in a resource discovery section including a plurality of resource units, selecting a specific resource unit for transmitting the signal based on a result of the resource sensing, and transmitting the signal using a first reference signal sequence via the specific resource unit. In this case, the specific resource unit may correspond to a resource occupied by a second UE and the first reference signal sequence is determined based on a second reference signal sequence of the second UE.

To further achieve these and other advantages and in accordance with the purpose of the present invention, according to a different embodiment, a first UE (user equipment) transmitting a signal between UEs in a wireless communication system includes a transceiver configured to transceive a signal between UEs, and a processor connected with the transceiver, the processor configured to perform resource sensing in a resource discovery section including a plurality of resource units, the processor configured to select a specific resource unit for transmitting the signal based on a result of the resource sensing, the processor configured to transmit the signal using a first reference signal sequence via the specific resource unit. In this case, the specific resource unit may correspond to a resource occupied by a second UE and the first reference signal sequence is determined based on a second reference signal sequence of the second UE.

According to each embodiment of the present invention, the specific resource unit can be positioned after the resource discovery section in a time unit.

According to each embodiment of the present invention, the first reference signal sequence and the second reference signal sequence may correspond to a demodulation reference signal sequence.

According to each embodiment of the present invention, a cyclic shift value of the first reference signal sequence may have a least correlation relation with a cyclic shift value of the second reference signal sequence.

According to each embodiment of the present invention, the resource sensing can be performed on a resource unit for performing scheduling assignment.

The specific resource unit may correspond to a resource unit having smallest reception power among a plurality of the resource units.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to embodiments of the present invention, it is able to efficiently configure a resource for performing device to device communication.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE

Mode for Invention

Figure 1:
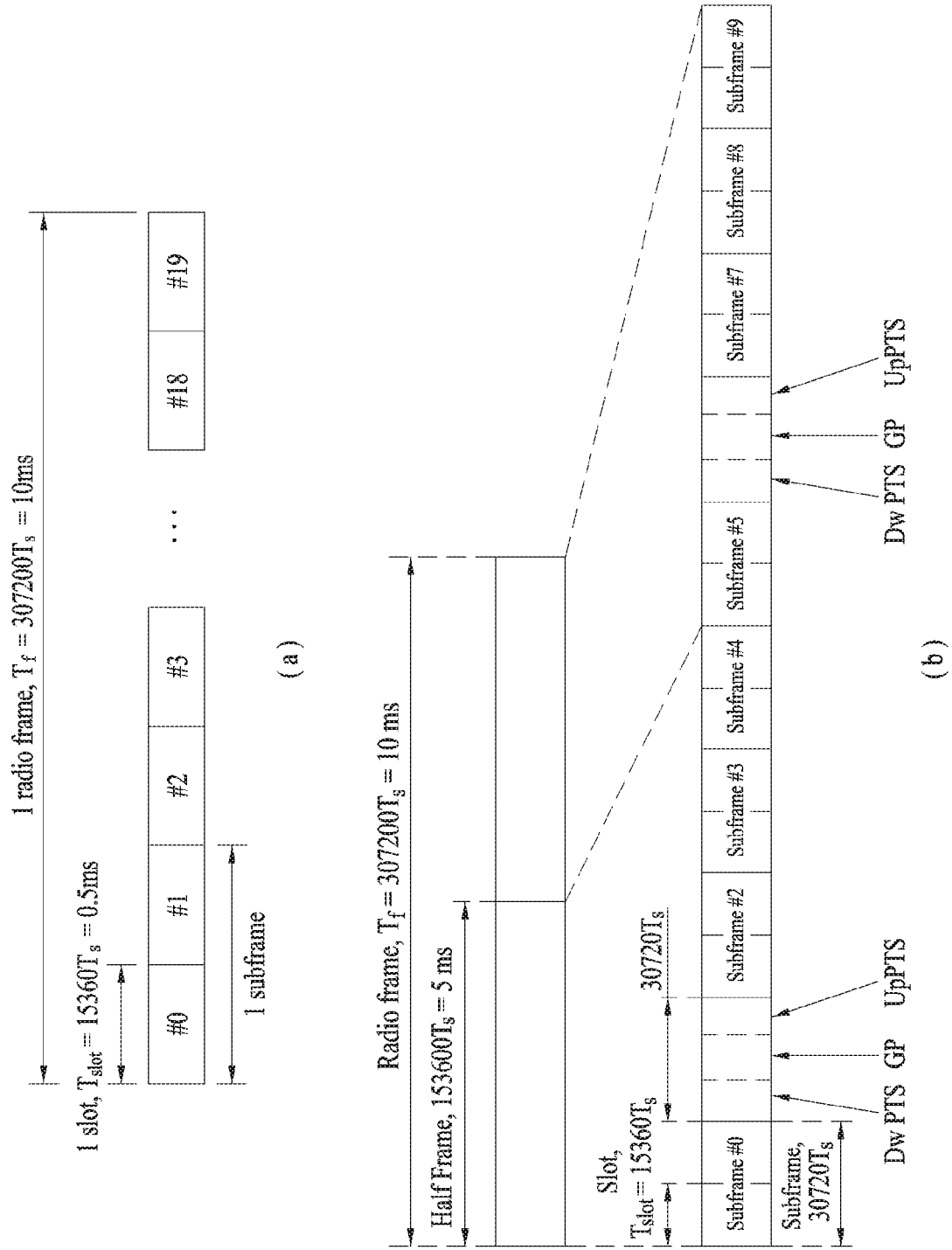
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a base station (BS) generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Hereinafter, a BS is referred to as an eNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, an RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. Unlike a conventional centralized antenna system (CAS) (i.e. a single-node system) including antennas which converge upon an eNB and are controlled by one eNB controller, a multi-node system includes a plurality of nodes separated from one another by a predetermined distance or more. The plural nodes may be managed by one or more eNBs or eNB controllers for controlling operation thereof or scheduling data transmission/reception therethrough. Each node may be connected to an eNB or eNB controller for managing the node through a cable or a dedicated line. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system of the present invention, which will be described below, one or more eNBs or eNB controllers, connected to a plurality of nodes, may control the plural nodes to simultaneously transmit or receive signals to or from a UE through some or all of the plural nodes. Although there is a difference between multi-node systems according to the nature of each node and implementation form of each node, the multi-node systems are different from single-node systems (e.g. a CAS, a conventional MIMO system, a conventional relay system, a conventional repeater system, etc.), in that plural nodes participate in providing a communication service to a UE on a predetermined time-frequency resource. Accordingly, embodiments of the present invention regarding a method for performing cooperative data transmission using some or all of plural nodes may be applied to various types of multi-node systems. For example, while a node generally refers to an antenna group separated by a predetermined interval or more from another node, the embodiments of the present invention, which will be described later, may be applied even when a node means an arbitrary antenna group irrespective of how far the node is separated from another node. For example, when an eNB includes a cross polarized (X-pole) antenna, the embodiments of the present invention are applicable under the assumption that the eNB controls a node including a horizontally polarized (H-pole) antenna and a node including a vertically polarized (V-pole) antenna.

A communication scheme capable of transmitting/receiving a signal through a plurality of transmission (TX)/reception (RX) nodes, transmitting/receiving a signal through at least one node selected from among a plurality of TX/RX nodes, or differentiating a node transmitting a downlink signal from a node receiving an uplink signal is referred to as multi-eNB MIMO or coordinated multi-point TX/RX (CoMP). A coordinated transmission scheme of such coordinated communication between nodes may be classified largely into joint processing (JP) and scheduling coordination (CB). The JP scheme may further be divided into joint transmission (JT) and dynamic point selection (DPS) and the CB scheme may further be divided into coordinated scheduling (CS) and coordinated beamforming (CB). DPS may also be called dynamic cell selection (DCS). When JP is performed compared with other communication schemes among coordination communication schemes between nodes, a wider variety of communication environments may be formed. JT of the JP scheme is a communication scheme for transmitting the same stream to a UE from a plurality of nodes. The UE restores the stream by combining signals received from the plural nodes. JT can improve reliability of signal transmission using transmit diversity because the same stream is transmitted by plural nodes. DPS of the JP scheme is a communication scheme for transmitting/receiving a signal through one node selected according to a specific rule from among a plurality of nodes. In DPS, since a node having a good channel state with a UE will typically be selected as a communication node, reliability of signal transmission can be improved.

Meanwhile, in the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Furthermore, channel status/quality of a specific cell refers to channel status/quality of a channel or communication link formed between an eNB or node which provides a communication service to the specific cell and a UE. In a 3GPP LTE-A based system, the UE may measure a downlink channel state from a specific node using a channel state information-reference signal(s) (CSI-RS(s)) transmitted on a CSI-RS resource allocated to the specific node by an antenna port(s) of the specific node. Generally, neighboring nodes transmit corresponding CSI-RSs on orthogonal CSI-RS resources. When CSI-RS resources are orthogonal, this mean that at least one of CSI-RS resource configuration which specify symbols and subcarriers carrying the CSI-RSs, subframe configuration which specify subframes, to which CSI-RSs are allocated, by using subframe offset, transmission period and etc., and/or CSI-RS sequence is different from each other.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/

PRACH RE or PDCCH/PCFICH/PHICH/PDSCH/PUCCH/PUSCH/PRACH time-frequency resource, respectively. Therefore, in the present invention, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | DwPTS | Normal cyclic prefix in downlink | | Extended cyclic prefix in downlink | | |
|---|---|---|---|---|---|---|
| | | | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

Referring to FIG. 1, a 3GPP LTE(-A) radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15\text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

Figure 2:
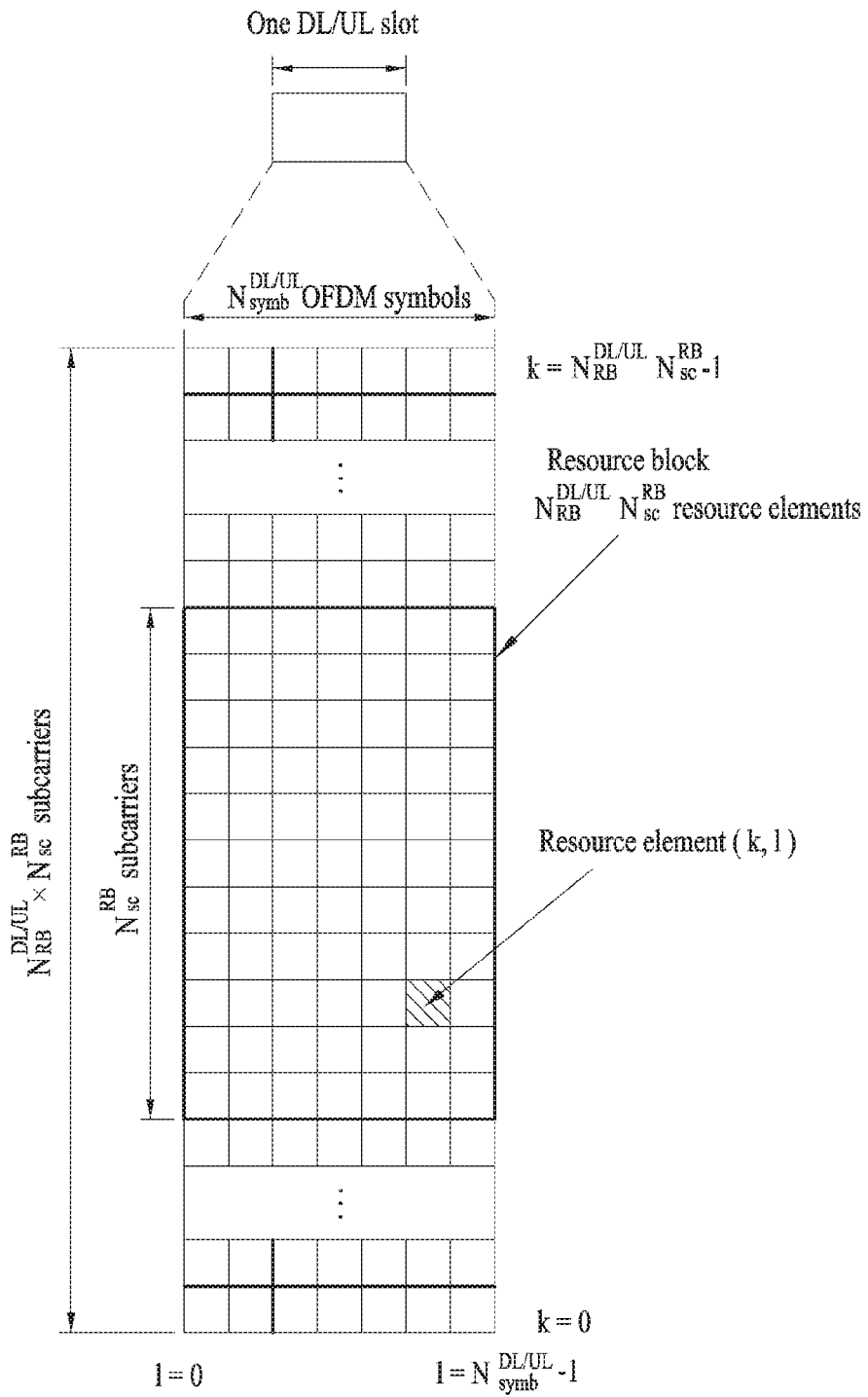
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE(-A) system. One resource grid is defined per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} 1 - 1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
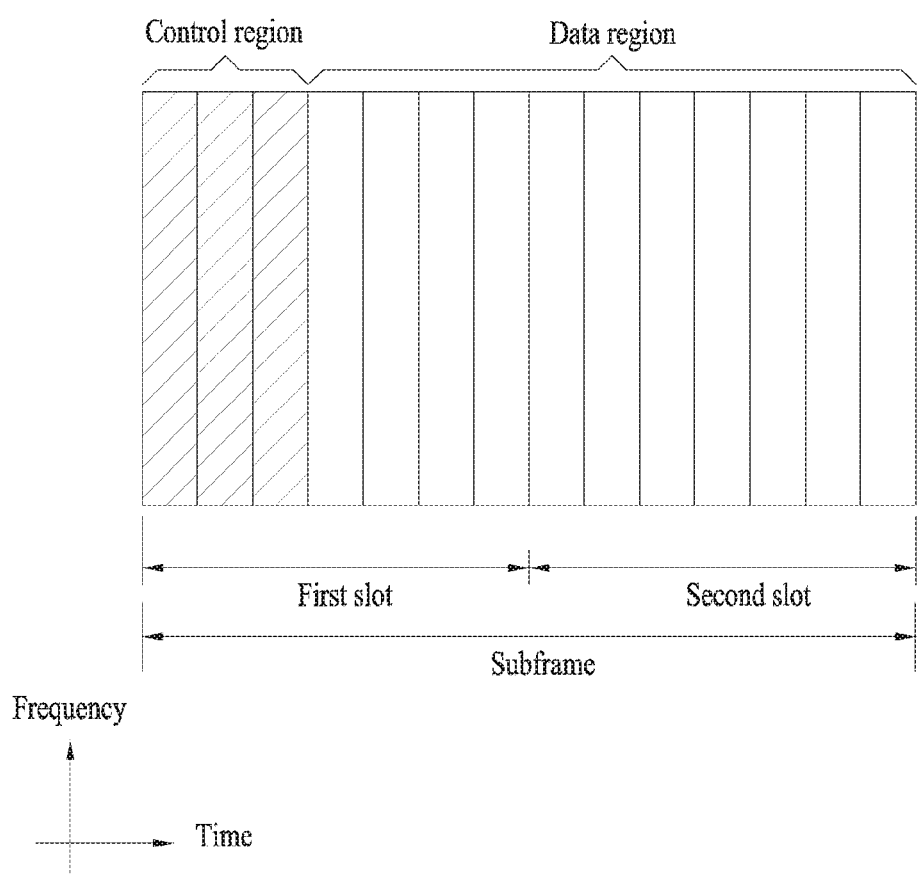
FIG. 3 illustrates the structure of a DL subframe used in a 3GPP (3$^{rd}$ Generation Partnership Project) LTE (Long Term Evolution)/LTE-A (Advanced) system.

FIG. 3 illustrates the structure of a DL subframe used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate. In the current 3GPP LTE system, various formats are defined, wherein format 0 is defined for a UL, and formats 1, 1A, 1B, 1C, 1D, 2, 2A, 3, and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

Generally, a DCI format capable of being transmitted to the UE differs according to transmission mode (TM) configured for the UE. In other words, for the UE configured as a specific TM, all DCI formats cannot be used and only predetermined DCI format(s) corresponding to the specific TM can be used.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. In a 3GPP LTE system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. In the 3GPP LTE/LTE-A system, SSs for respective PDCCH formats may have different sizes and a dedicated search space and a common search space are defined. The dedicated search space is a UE-specific search space and is configured for each individual UE. The common search space is configured for a plurality of UEs. One PDCCH candidate corresponds to 1, 2, 4, or 8 CCEs according to CCE aggregation levels. An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

The eNB may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of DCI transmitted on one PDCCH may vary according to DCI format and the size of the DCI may vary according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

For demodulation of a signal transmitted between an eNB and a UE, a reference signal (RS) to be compared with a data signal is needed. The RS indicates a signal of a predefined special waveform, known to the eNB and UE, transmitted from the eNB to the UE or from the UE to the eNB and is referred to as a pilot signal. RSs are classified into a cell-specific RS (CRS) commonly used by all UEs in a cell and a demodulation RS (DM RS) dedicated to a specific UE. A DM RS that the eNB transmits for DL data demodulation for a specific UE may be referred to specifically as a UE-specific RS. The DL DM RS and CRS may be transmitted together or one of the DM RS or the CRS may be transmitted. Nonetheless, in the case in which only the DM RS is transmitted without the CRS, an RS for channel measurement should be separately provided because the DM RS transmitted by applying the same precoder as data can be used only for demodulation. For example, in 3FPP LTE(-A), a CSI-RS, which is an additional RS for measurement, is transmitted to the UE so that the UE may measure CSI. The CSI-RS is transmitted in every prescribed transmission period comprised of multiple subframes, unlike a CRS transmitted in every subframe, based on the fact that channel state does not undergo a substantial variation over time.

Figure 4:
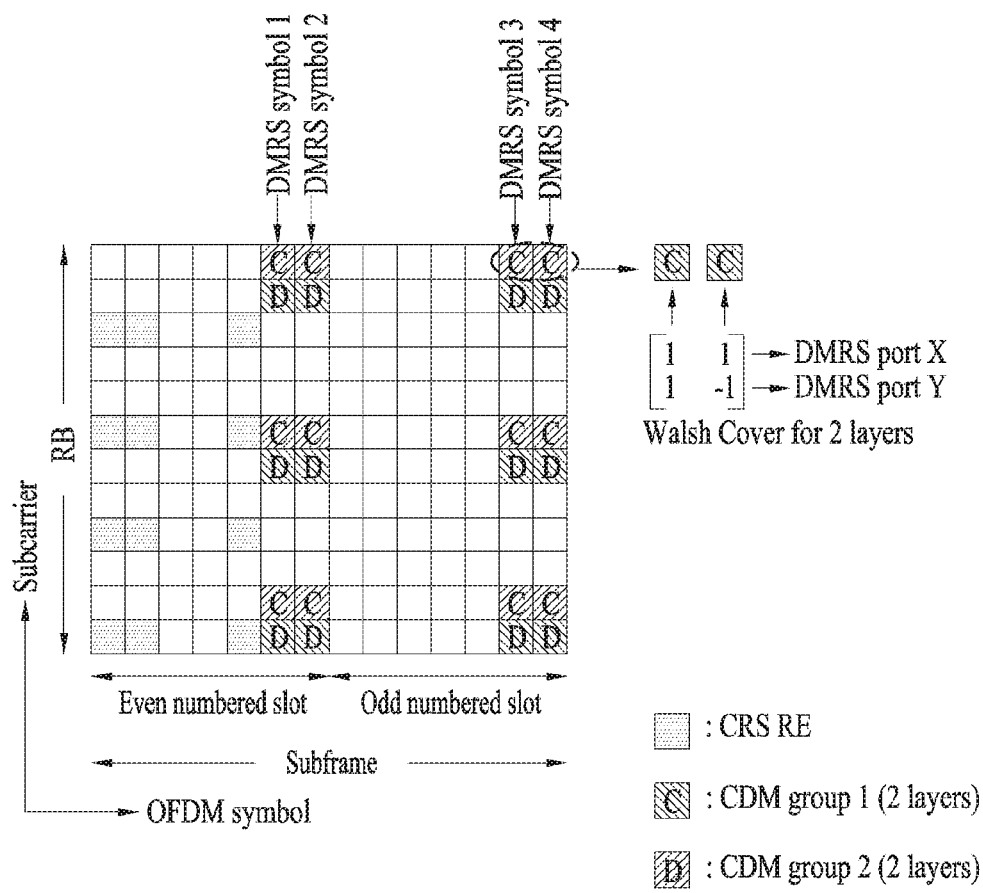
FIGS. 4 and 5 illustrate time-frequency resources for cell-specific reference signals (CRSs) and demodulation reference signals (DM RSs) in an RB pair of a normal subframe having a normal cyclic prefix (CP).
Figure 5:
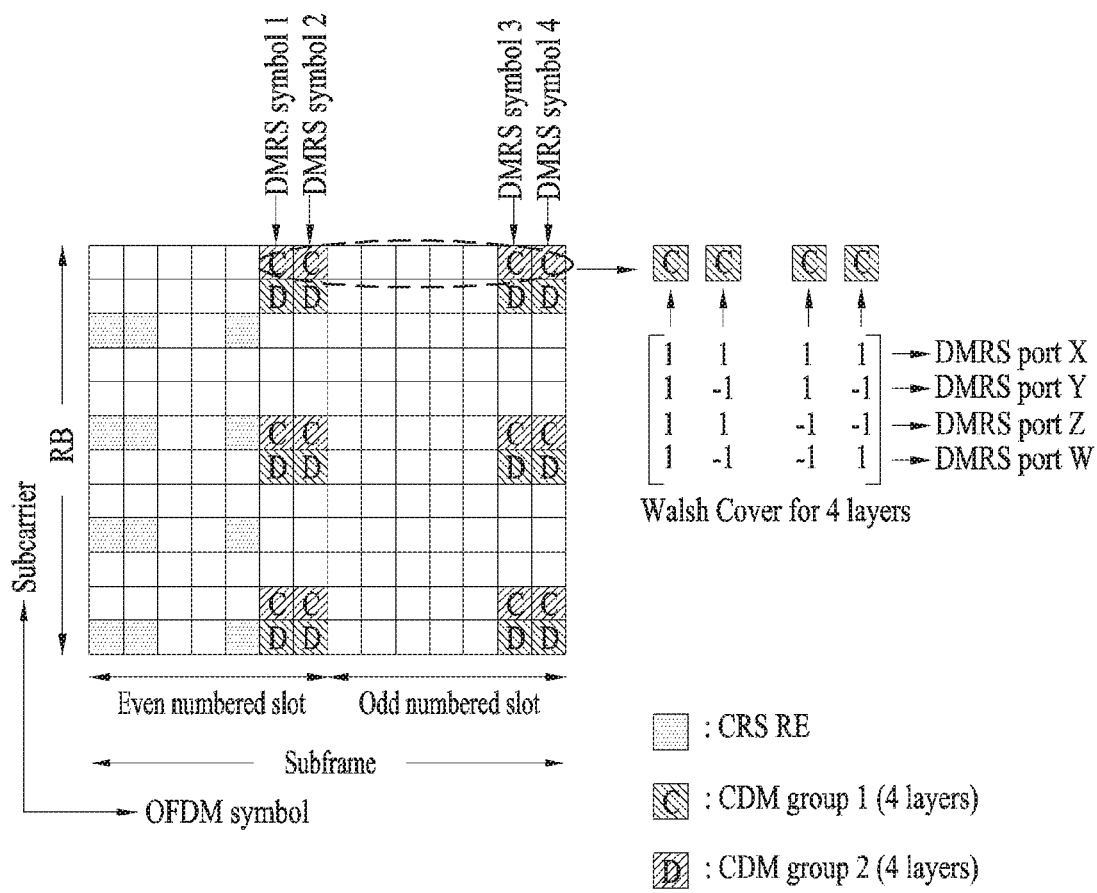

FIGS. 4 and 5 illustrate time-frequency resources for CRSs and DM RSs in an RB pair of a normal subframe having a normal CP. Specifically, FIG. 4 illustrates a method for multiplexing a maximum of 4 DM RSs with two CDM groups and FIG. 5 illustrates a method for multiplexing a maximum of 8 DM RSs with two CDM groups.

Referring to FIGS. 4 and 5, DM RSs are defined in a PRB pair in a 3GPP LTE(-A) system. Hereinbelow, among REs of one PRB pair, a set of REs in which distinguishable DM RSs extended by orthogonal cover codes are transmitted is referred to as a code division multiplexing (CDM) group. The orthogonal cover code may be, for example, a Walsh-Hadmard code. The orthogonal cover code may also be called an orthogonal sequence. Referring to FIGS. 4 and 5, REs denoted by 'C' belong to one CDM group (hereinafter, CDM group 1) and REs denoted by 'D' belong to another CDM group (hereinafter, a CDM group 2).

In a 3GPP LTE(-A) system, a plurality of layers may be multiplexed in one subframe and then is transmitted to a receiving device. In the present invention, a layer transmitted by a transmitting device indicates an information input path to a precoder. The layer may be referred to as a transmission layer, a stream, a transmission stream, or a data stream. Transmission data is mapped to one or more layers. Therefore, data is transmitted from the transmitting device to the receiving device by one or more layers. In case of multi-layer transmission, the transmitting device transmits DM RS per layer, and the number of DM RSs increases in proportion to the number of transmission layers.

One antenna port may transmit one layer and one DM RS. When the transmitting device needs to transmit 8 layers, a maximum of four antenna ports may transmit four DM RSs using one CDM group. For example, referring to FIG. 5, DM RS port X, DM RS port Y, DM RS port Z, and DM RS port W may transmit four DM RSs spread by different orthogonal sequences, respectively, using the same CDM group. The receiving device may detect the DM RSs from signals received on four consecutive DM RS REs in an OFDM direction, using orthogonal sequences used to multiplex the DM RSs on the four DM RS REs.

A DM RS is generated from a seed value based on a physical layer cell ID $N^{cell}_{ID}$. For example, for any of antenna ports $p \in \{7, 8, \ldots, \gamma+6\}$, the DM RS may be defined by $$r(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = \begin{cases} 0, 1, \ldots, 12N^{max,DL}_{RB} - 1 & \text{normal cyclic prefix} \\ 0, 1, \ldots, 16N^{max,DL}_{RB} - 1 & \text{extended cyclic prefix} \end{cases}$$

In Equation 1, $N^{max,DL}_{RB}$ is the largest DL bandwidth configuration, expressed in multiples of $N^{RB}_{sc}$. The pseudo-random sequence c(i) may be defined by a length-31 Gold sequence. The output sequence c(n) of length $M_{PN}$, where $n=0, 1, \ldots, M_{PN}-1$, is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 2]}$$

In Equation 2, $N_C = 1600$ and the first m-sequence is initialized with $x_1(0)=1$, $x_1(n)=0$, $n=1, 2, \ldots, 30$. The initialization of the second m-sequence is denoted by the following equation with a value depending on the application of the sequence.

$$c_{init} = \sum_{i=0}^{30} x_2(i) \cdot 2^i \quad \text{[Equation 3]}$$

For Equation 1, the pseudo-random sequence generator is initialized with the following equation at the start of each subframe.

$$c_{init} = (\lfloor n_s/2 \rfloor + 1) \cdot (2N^{cell}_{ID} + 1) \cdot 2^{16} + n_{SCID} \quad \text{[Equation 4]}$$

In Equation 4, the value of $n_{SCID}$ is zero unless specified otherwise. For a PDSCH transmission on ports 7 or 8, $n_{SCID}$ is given by the DCI format 2B or 2C associated with the PDSCH transmission. DCI format 2B is a DCI format for resource assignment for a PDSCH using up to two antenna ports with DM RSs and DCI format 2C is a DCI format for resource assignment for a PDSCH using up to 8 antenna ports with DM RSs. In the case of DCI format 2B, $n_{SCID}$ is indicated by the scrambling identity field according to Table 3. In the case of DCI format 2C, $n_{SCID}$ is given by Table 4.

TABLE 3

| Scrambling identity field in DCI format 2B | $n_{SCID}$ |
| --- | --- |
| 0 | 0 |
| 1 | 1 |

TABLE 4

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |

TABLE 4-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 7 | Reserved | 7 | 8 layers, ports 7-14 |

Figure 6:
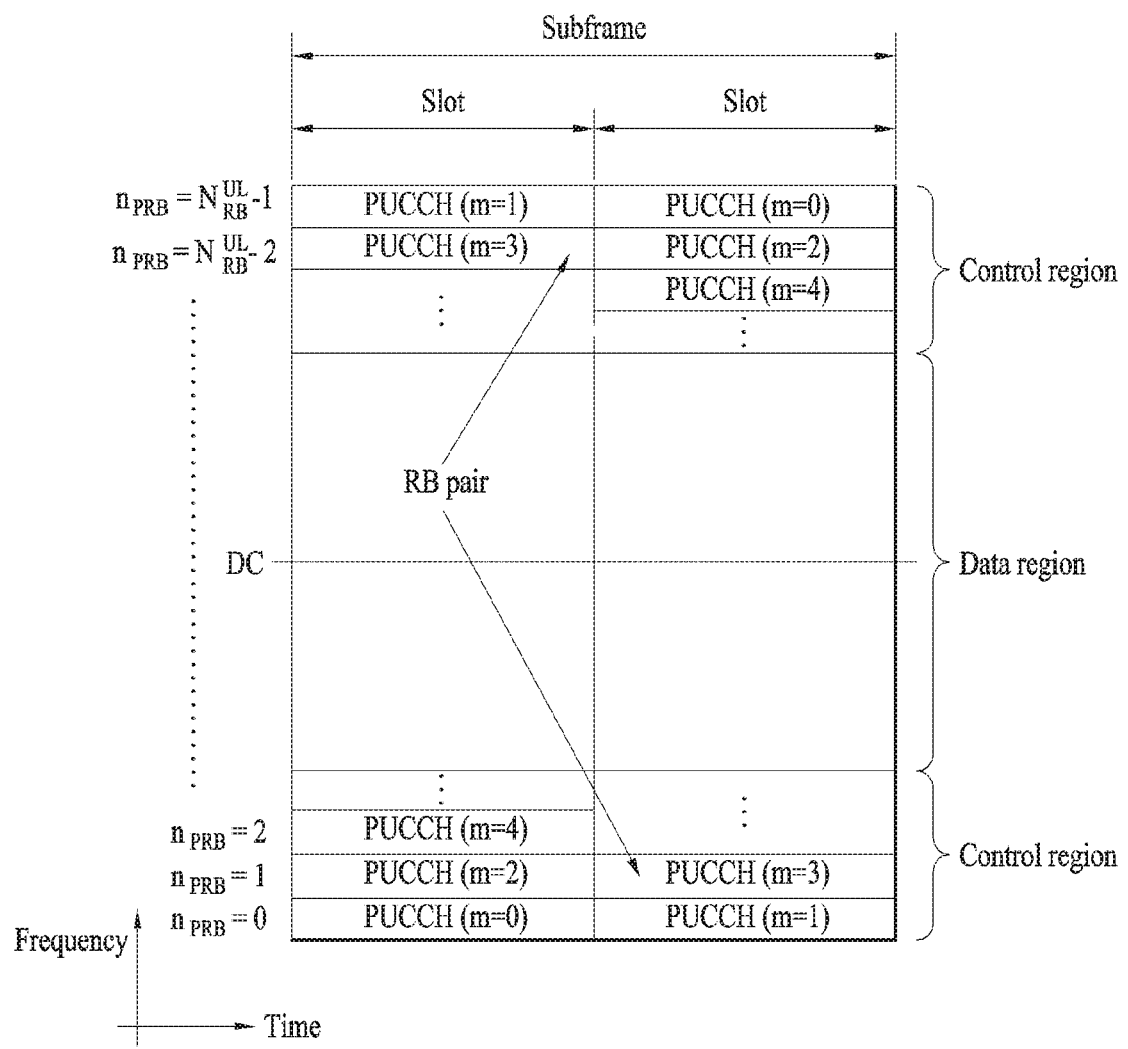
FIG. 6 illustrates the structure of a UL subframe used in a 3GPP LTE/LTE-A system.

FIG. 6 illustrates the structure of a UL subframe used in a 3GPP LTE(-A) system.

Referring to FIG. 6, a UL subframe may be divided into a data region and a control region in the frequency domain. One or several PUCCHs may be allocated to the control region to deliver UCI. One or several PUSCHs may be allocated to the data region of the UE subframe to deliver user data.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

The amount of UCI that can be transmitted by a UE in a subframe depends on the number of SC-FDMA symbols available for control information transmission. SC-FDMA symbols available for UCI correspond to SC-FDMA symbols other than SC-FDMA symbols used for reference signal transmission in a subframe. In the case of a subframe in which an SRS is configured, the last SC-FDMA symbol in the subframe is excluded from the SC-FDMA symbols available for UCI. A reference signal is used for coherent PUCCH detection. A PUCCH supports various formats according to transmitted information.

Table 5 shows a mapping relationship between PUCCH formats and UCI in an LTE/LTE-A system.

TABLE 5

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codewords |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH format series are mainly used to transmit ACK/NACK information, PUCCH format 2 series are mainly used to carry channel state information (CSI) such as channel quality indicator (CQI)/precoding matrix indicator (PMI)/rank indicator (RI), and PUCCH format 3 series are mainly used to transmit ACK/NACK information.

FIGS. 7 to 11 illustrate UCI transmission using PUCCH format 1 series, PUCCH format 2 series, and PUCCH format 3 series.

In a 3GPP LTE/LTE-A system, a DL/UL subframe having a normal CP consists of two slots each including 7 OFDM symbols and a DL/UL subframe having an extended CP consists of two slots each having 6 OFDM symbols. Since the number of OFDM symbols in each subframe varies with CP length, a structure in which a PUCCH is transmitted in a UL subframe also varies with CP length. Accordingly, a UCI transmission method of a UE in the UL subframe depends on a PUCCH format and CP length.

Figure 7:
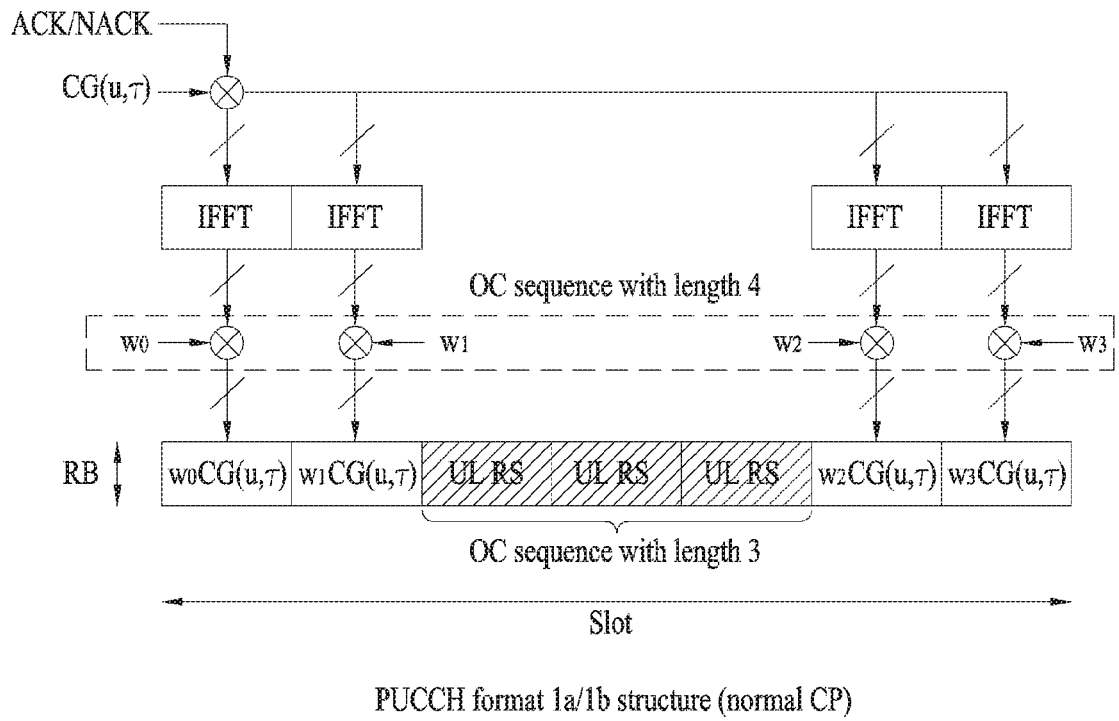
FIGS. 7 to 11 illustrate UCI transmission using physical uplink control channel (PUCCH) format 1 series, PUCCH format 2 series, and PUCCH format 3 series.
Figure 8:
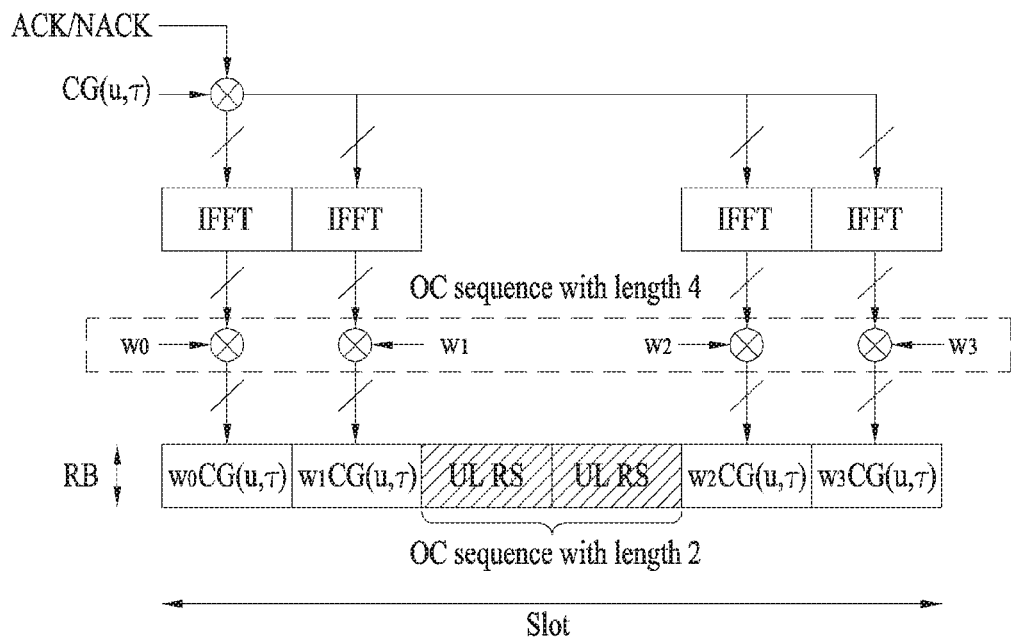

Referring to FIGS. 7 and 8, control information transmitted using PUCCH formats 1a and 1b is repeated with the same contents on a slot basis in a subframe. Each UE transmits an ACK/NACK signal on different resources including different cyclic shifts (frequency domain codes) of a computer-generated constant amplitude zero autocorrelation (CG-CAZAC) sequence and orthogonal covers (OCs) or orthogonal cover codes (OCCs) (time domain spreading codes). An OCC is referred to as an orthogonal sequence. An OC includes, for example, a Walsh/discrete Fourier transform (DFT) OC. Provided that the number of cyclic shifts is 6 and the number of OCs is 3, a total of 18 PUCCHs may be multiplexed in the same physical resource block (PRB) based on a single antenna port. Orthogonal sequences $w_0$, $w_1$, $w_2$ and $w_3$ may be applied in either an arbitrary time domain (after fast Fourier transform (FFT) modulation) or an arbitrary frequency domain (before FFT modulation). In the 3GPP LTE/LTE-A system, PUCCH resources for ACK/NACK transmission are expressed as a combination of a position of a time-frequency resource (e.g. PRB), a cyclic shift of a sequence for frequency spreading, and a (quasi) OC for time spreading and each PUCCH resource is indicated using a PUCCH resource index (also referred to as a PUCCH index). PUCCH format 1 series for scheduling request (SR) transmission is the same in a slot level structure as PUCCH format 1a and 1b and differs only in a modulation method from the PUCCH formats 1a and 1b.

Figure 9:
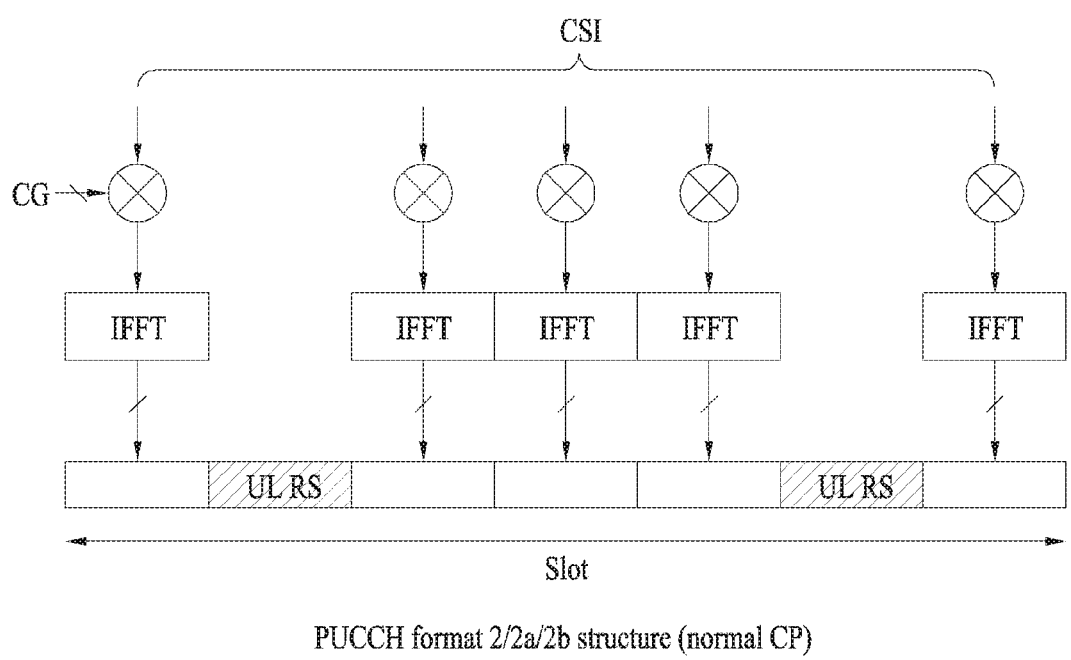
Figure 10:
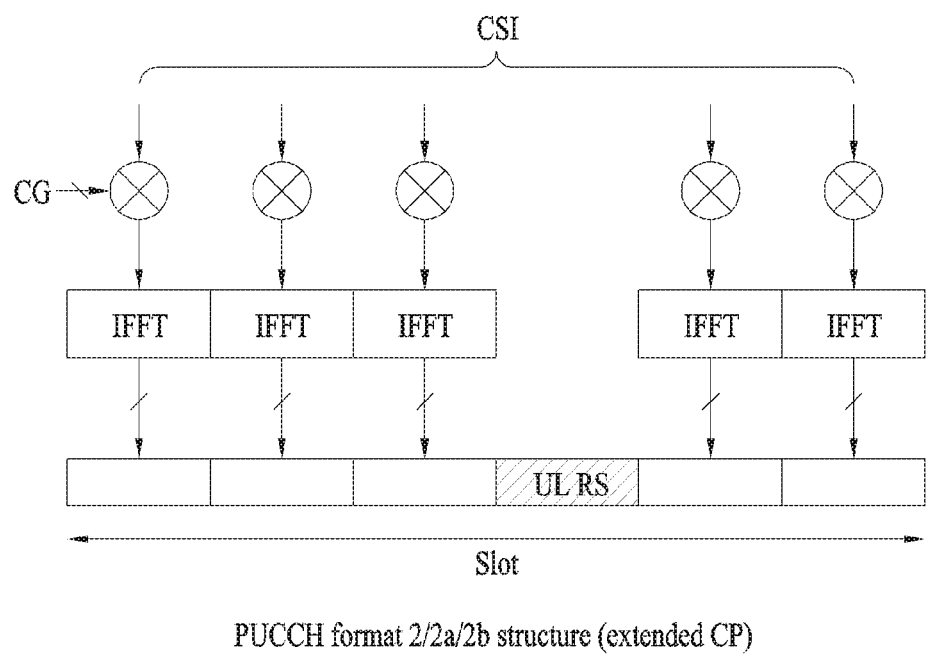

FIG. 9 illustrates an example of transmitting channel state information (CSI) using PUCCH formats 2/2a/2b in a UL slot having a normal CP and FIG. 10 illustrates an example of transmitting CSI using PUCCH formats 2/2a/2b in a UL slot having an extended CP.

Referring to FIGS. 9 and 10, in a normal CP, one UL subframe includes 10 OFDM symbols except for a symbol carrying a UL RS. CSI is coded into 10 transport symbols (also referred to as complex-valued modulation symbols) through block coding. The 10 transport symbols are mapped to the 10 OFDM symbols, respectively, and then are transmitted to an eNB.

PUCCH format 1/1a/1b and PUCCH format 2/2a/2b may carry only up to a predetermined number of bits. However, as carrier aggregation and the number of antennas have increased and a TDD system, a relay system, and a multi-node system have been introduced, the amount of UCI has increased and thus a PUCCH format capable of carrying more UCI than PUCCH format 1/1a/1b/2/2a/2b has been introduced. This format is referred to as PUCCH format 3. For instance, PUCCH format 3 may be used when a UE for which carrier aggregation is configured transmits, through a specific UL carrier, a plurality of ACK/NACK signals for a plurality of PDSCHs received from the eNB through a plurality of DL carriers.

Figure 11:
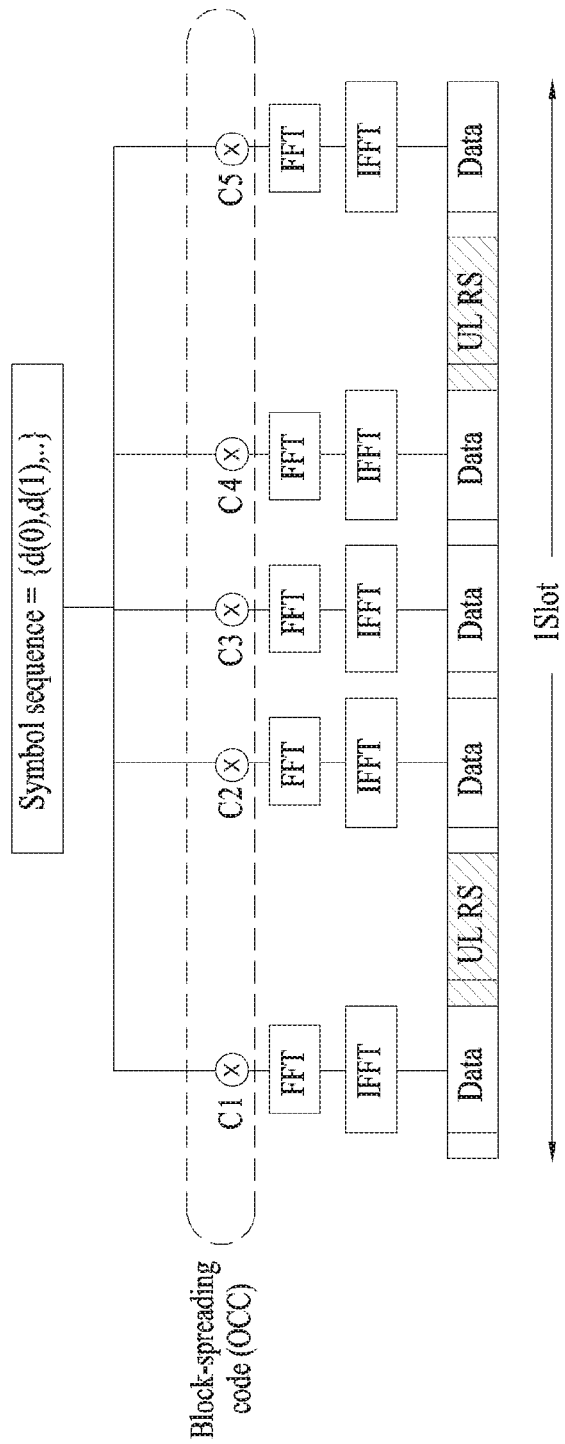

PUCCH format 3 may be configured based on, for example, block-spreading. Referring to FIG. 11, block-spreading is a scheme for spreading a symbol sequence by an OCC (also called an orthogonal sequence) on the time domain and transmitting the spread symbol sequence. According to the block-spreading scheme, control signals of multiple UEs may be multiplexed on the same RB by the OCC and transmitted to an eNB. In PUCCH format 2, one symbol sequence is transmitted over the time domain, and UCI of the UEs is multiplexed using a cyclic shift of a CAZAC sequence and transmitted to the eNB. On the other hand, in a new PUCCH format based on block spreading (hereinafter, PUCCH format 3), one symbol sequence is transmitted over the frequency domain, and the UCI of the UEs is multiplexed using OCC based time-domain spreading and transmitted to the eNB. For example, referring to FIG. 9, one symbol sequence is spread by a length-5 (i.e. spreading factor (SF)=5) OCC and mapped to five SC-FDMA symbols. While a total of two RS symbols is used in one slot in FIG. 11, three RS symbols may be used and an OCC of SF=4 may be used to spread a symbol sequence and multiplex signals of UEs. The RS symbols may be generated by a CAZAC sequence having a specific cyclic shift and may be transmitted to the eNB from the UE in a manner of applying (multiplying) a specific OCC to/by a plurality of RS symbols in the time domain. In FIG. 11, DFT may be applied prior to the OCC and FFT may be applied instead of DFT.

In FIGS. 7 to 11, UL RSs transmitted along with UCI on a PUCCH may be used to demodulate the UCI at the eNB.

Figure 12:
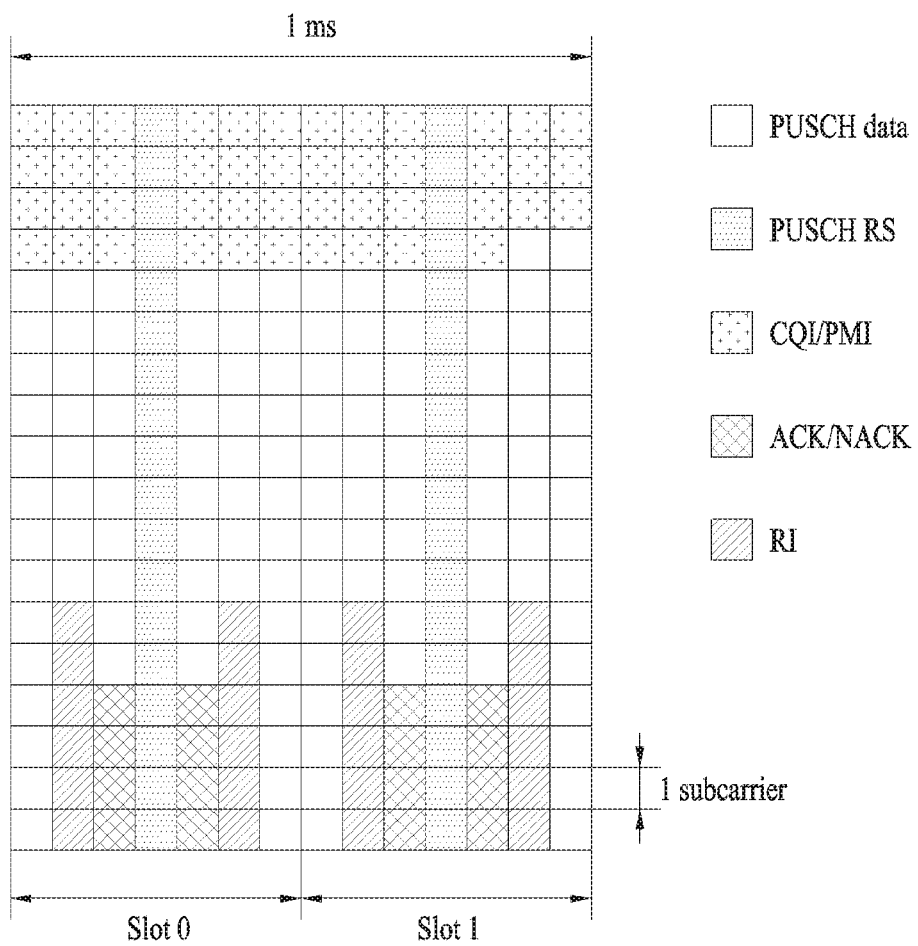
FIG. 12 illustrates multiplexing of UCI and UL data in a physical uplink shared channel (PUSCH) region.

FIG. 12 illustrates multiplexing of UCI and UL data in a PUSCH region.

UL data may be transmitted through a PUSCH in a data region of a UL subframe. A DM RS, which is an RS signal used to demodulate the UL data, may be transmitted together with the UL data in a data region of the UL subframe. Hereinafter, a control region and a data region in the UL subframe will be referred to as a PUCCH region and a PUSCH region, respectively.

If UCI needs to be transmitted in a subframe to which PUSCH transmission is allocated, the UE multiplexes the UCI and UL data (hereinafter, PUSCH data) prior to DFT-spreading and transmits the multiplexed UL signal on a PUSCH, unless simultaneous transmission of a PUSCH and PUCCH is permitted. The UCI includes at least one of CQI/PMI, HARQ ACK/NACK, and RI. The number of REs used for CQI/PMI, ACK/NACK, and RI transmission is based on a modulation and coding scheme (MCS) allocated for PUSCH transmission and on offset values $\Delta^{CQI}_{offset}$, $\Delta^{HARQ-ACK}_{offset}$, and $\Delta^{RI}_{offset}$. The offset values permit different coding rates according to UCI and are semi-statically configured by higher-layer (e.g. radio resource control (RRC) signaling. The PUSCH data and UCI are not be mapped to the same RE. The UCI is mapped to both slots of a subframe.

Referring to FIG. 12, CQI and/or PMI (CQI/PMI) resources are located at the start part of PUSCH data resources. The CQI/PMI resources are sequentially mapped to all SC-FDMA symbols on one subcarrier and then are mapped on the next subcarrier. The CQI/PMI resources are mapped starting from left to right, that is, in the direction of ascending SC-FDMA symbol index, within a subcarrier. The PUSCH data is rate-matched in consideration of the amount of the CQI/PMI resources (i.e. the number of coded symbols). A modulation order which is the same as the modulation order of UL-SCH data is used for CQI/PMI. ACK/NACK is inserted through puncturing part of SC-FDMA resources to which UL-SCH data is mapped. ACK/NACK is located besides a PUSCH RS which is an RS used to demodulate the PUSCH data and is filled starting bottom to top, that is, in the direction of ascending subcarrier index, within an SC-FDMA symbol. In the case of a normal CP, SC-FDMA symbols for ACK/NACK are located at SC-FDMA symbols #2/#5 in each slot as illustrated in FIG. 12. Irrespective of whether ACK/NACK is actually transmitted in a subframe, a coded RI is located next to the symbol for ACK/NACK.

In 3GPP LTE, UCI may be scheduled to be transmitted on a PUSCH without PUSCH data. ACK/NACK, RI, and CQI/PMI may be multiplexed in a similar way to multiplexing as illustrated in FIG. 12. Channel coding and rate matching for control signaling without the PUSCH data are identical to channel coding and rate matching for control signaling with the PUSCH data.

In FIG. 12, the PUSCH RS may be used to demodulate the UCI and/or the PUSCH data transmitted in a PUSCH region. In the present invention, a UL RS associated with PUCCH transmission and a PUSCH RS associated with PUSCH transmission are referred to as a DM RS.

Meanwhile, although not shown in FIG. 12, a sounding reference signal (SRS) may be allocated to a PUSCH region. The SRS is a UL RS not associated with PUSCH or PUCCH transmission. The SRS is transmitted on an OFDM symbol which is located at the last part of a UL subframe in the time domain and on a data transmission band of the UL subframe, that is, on the PUSCH region, in the frequency domain. The eNB may measure a UL channel state between the UE and the eNB using the SRS. SRSs of multiple UEs transmitted/received on the last OFDM symbol of the same subframe may be distinguished according to a frequency location/sequence.

Since the UL RS, the PUSCH RS, and the SRS are UE-specifically generated by a specific UE and are transmitted to the eNB, theses signals may be called UL UE-specific RSs.

The UL UE-specific RS is defined by a cyclic shift of a base sequence according to a predetermined rule. For example, an RS sequence $r^{(\alpha)}_{u,v}(n)$ is defined by a cyclic shift $\alpha$ of a base sequence $r_{u,v}(n)$.

$$r_{u,v}^{(\alpha)}(n) = e^{j\alpha n} r_{u,v}(n), \ 0 \le n < M_{sc}^{RS} \quad \text{[Equation 5]}$$

In Equation 5, $M^{RS}_{sc} = m \cdot N^{RB}_{sc}$ is the length of the reference signal sequence and $1 \le m \le N^{max,UL}_{RB}$. $N^{max,UL}_{RB}$ is the largest UL bandwidth configuration, expressed in multiples of $N^{RB}_{sc}$. Multiple reference signal sequences may be defined from a single base sequence through different values of $\alpha$. For a DM RS and an SRS, a plurality of base sequences is defined. For example, base sequences may be defined using a root Zadoff-Chu sequence. Base sequences $r_{u,v}(n)$ are divided into groups. Each base sequence group contains one or more base sequences. For example, each base sequence group may contain one base sequence (v=0) of each length $M^{RS}_{sc} = m \cdot N^{RB}_{sc}$ ($1 \le m \le 5$) and two base sequences of each length $M^{RS}_{sc} = m \cdot N^{RB}_{sc}$ ($6 \le m \le N^{RB}_{sc}$). In $r_{u,v}(n)$, $u \in \{0, 1, \ldots, 29\}$ is the group number (i.e. group index), v is the base sequence number within the group (i.e. base sequence index). The sequence group number u and the number v within the group may vary in time.

The sequence-group number u in slot $n_s$ is defined by a group hopping pattern $f_{gh}(n_s)$ and a sequence-shift pattern $f_{ss}$ according to the following equation.

$$u = (f_{gh}(n_s) + f_{ss}) \bmod 30 \quad \text{[Equation 6]}$$

There are plural different (e.g. 17) hopping patterns and plural different (e.g. 30) sequence shift patterns. Sequence-group hopping can be enabled or disabled by a cell-specific parameter provided by higher layers.

The group-hopping pattern $f_{gh}(n_s)$ may be given for PUSCH and PUCCH by the following equation.

$$f_{gh}(n_s) = \begin{cases} 0 & \text{if group hopping is disabled} \\ \left( \sum_{i=0}^{7} c(8n_s + i) \cdot 2^i \right) \bmod 30 & \text{if group hopping is enabled} \end{cases} \quad \text{[Equation 7]}$$

In Equation 7, the pseudo-random sequence c(i) is defined by Equation 2. The pseudo-random sequence generator is initialized with $c_{init}$ according to the following equation at the beginning of each radio frame.

$$c_{init} = \left\lfloor \frac{N_{ID}^{cell}}{30} \right\rfloor \quad \text{[Equation 8]}$$

According to the current 3GPP LTE(-A) standards, the group-hopping pattern is the same for PUSCH and PUCCH according to Equation 7, but the sequence-shift pattern differs between PUCCH and PUSCH. For PUCCH, the sequence-shift pattern $f^{PUCCH}_{ss}$ is given by the following equation based on the cell ID.

$$f_{ss}^{PUCCH} = N_{ID}^{cell} \bmod 30 \quad \text{[Equation 9]}$$

A sequence shift pattern for a PUSCH $f^{PUSCH}_{ss}$ is given by the following equation using a sequence shift pattern $f^{PUCCH}_{ss}$ for a PUCCH and a value ($\Delta_{ss}$) configured by higher layers.

$$f_{ss}^{PUSCH} = (f_{ss}^{PUCCH} + \Delta_{ss}) \bmod 30 \quad \text{[Equation 10]}$$

In Equation 10, $\Delta_{ss} \in \{0, 1, \ldots, 29\}$.

Base sequence hopping only applies for RSs of length $M^{RS}_{sc} \ge 6 N^{RB}_{sc}$. For RSs of length $M^{RS}_{sc} < 6 N^{RB}_{sc}$, the base sequence number v within the base sequence group is given by v=0. For RSs of length $M^{RS}_{sc} \ge 6 N^{RB}_{sc}$, the base sequence number v within the base sequence group in slot $n_s$ is defined by $v = c(n_s)$ if group hopping is disabled and sequence hopping is enabled, otherwise defined by v=0, where the pseudo-random sequence c(i) is given by Equation 2. The pseudo-random sequence generator is initialized with $c_{init}$ according to the following equation at the beginning of each radio frame.

$$c_{init} = \left\lfloor \frac{N_{ID}^{cell}}{30} \right\rfloor \cdot 2^5 + f_{ss}^{PUSCH} \quad \text{[Equation 11]}$$

A sequence $r^{(p)}_{PUCCH}(\cdot)$ of a UL RS of FIGS. 7 to 11 (hereinafter, a PUCCH DM RS) is given by $$r_{PUCCH}^{(p)}(m' N_{RS}^{PUCCH} M_{sc}^{RS} + m M_{sc}^{RS} + n) = \frac{1}{\sqrt{P}} \overline{w}^{(p)}(m) z(m) r_{u,v}^{(\alpha\_p)}(n) \quad \text{[Equation 12]}$$

In Equation 12, $m=0, \ldots, N^{PUCCH}_{RS}-1$, $n=0, \ldots, M^{RS}_{sc}-1$, and $m'=0, 1$. $N^{PUCCH}_{RS}$ is the number of reference symbols per slot for PUCCH. P is the number of antenna ports used for PUCCH transmission. The sequence $r^{(\alpha\_p)}_{u,v}(n)$ is given by Equation 5 with $M^{RS}_{sc}=12$ where the cyclic shift $\alpha\_p$ is determined by the PUCCH format.

For PUCCH formats 2a and 2b, z(m) equals to d(10) for m=1. For all other cases, z(m)=1. For PUCCH formats 2a and 2b, supported for normal cyclic prefix only, the bit(s) $b(20), \ldots, b(M_{bit}-1)$ among $b(0), \ldots, b(M_{bit}-1)$ are modulated as described in the following table resulting a single modulation symbol d(10) used in the generation of the RS for PUCCH format 2a and 2b.

TABLE 6

| PUCCH format | b(20), ..., b($M_{bit}$ − 1) | d(10) |
|---|---|---|
| 2a | 0 | 1 |
|  | 1 | −1 |
| 2b | 00 | 1 |
|  | 01 | −j |
|  | 10 | j |
|  | 11 | −1 |

A PUSCH RS of FIG. 12 (hereinafter, PUSCH DM RS) is transmitted per layer. A PUSCH DM RS sequence $r^{(p)}_{PUSCH}(\cdot)$ associated with a layer $\lambda \in \{0, 1, \ldots, \upsilon-1\}$ is given by $$r_{PUSCH}^{(\lambda)}(m \cdot M_{sc}^{RS} + n) = w^{(\lambda)}(m) r_{u,v}^{(\alpha\_\lambda)}(n) \quad \text{[Equation 13]}$$

In Equation 13, $m=0, 1$, $n=0, \ldots, M^{RS}_{sc}-1$, $M^{RS}_{sc}=M^{PUSCH}_{sc}$. $M^{PUSCH}_{sc}$ is scheduled bandwidth for UL transmission, expressed as a number of subcarriers. The orthogonal sequence $w^{(\lambda)}(m)$ may be given by Table 7 using the cyclic shift field in most recent UL-related DCI for the transport block associated with the corresponding PUSCH transmission. Table 7 shows an example mapping of cyclic shift field in UL-related DCI format to $n^{(2)}_{DMRS,\lambda}$ and $[w^{(\lambda)}(0) \ w^{(\lambda)}(1)]$.

TABLE 7

| Cyclic Shift Field in uplink-related DCI format | $n^{(2)}_{DMRS,\lambda}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

The cyclic shift $\alpha\_\lambda$ in slot $n_s$ is given as $2\pi n_{cs,\lambda}/12$ with $n_{cs,\lambda} = (n^{(1)}_{DMRS} + n^{(2)}_{DMRS,\lambda} + n_{PN}(n_s)) \bmod 12$. $n^{(1)}_{DMRS}$ is given by Table 8 according to cyclicShift provided by higher layers. Table 8 shows a mapping of cyclicShift given by higher layers to $n^{(1)}_{DMRS}$.

TABLE 8

| cyclicShift | $n^{(1)}_{DMRS}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

$n_{PN}(n_s)$ is given by the following equation using the cell-specific pseudo-random sequence $c(i)$.

$$n_{PN}(n_s) = \sum_{i=0}^{7} c(8N_{symb}^{UL} \cdot n_s + i) \cdot 2^i \quad \text{[Equation 14]}$$

In Equation 14, the pseudo-random sequence $c(i)$ is defined by Equation 2. The pseudo-random sequence generator is initialized with $c_{init}$ according to the following equation at the beginning of each radio frame.

$$c_{init} = \left\lfloor \frac{N_{ID}^{cell}}{30} \right\rfloor \cdot 2^5 + f_{ss}^{PUSCH} \quad \text{[Equation 15]}$$

Meanwhile, the SRS sequence $r^{(p)}_{SRS}(n) = r^{(\alpha\_p)}_{u,v}(n)$ is given by Equation 5, where u is the PUCCH sequence-group number described in the afore-mentioned group hopping, v is the base sequence number described in the afore-mentioned sequence hopping. The cyclic shift $\alpha\_p$ of SRS is given by the following equation.

$$\alpha_p = 2\pi \frac{n_{SRS}^{cs,p}}{8} \quad \text{[Equation 16]}$$

$$n_{SRS}^{cs,p} = \left( n_{SRS}^{cs} + \frac{8p}{N_{ap}} \right) \bmod 8$$

$$p \in \{0, 1, \ldots, N_{ap} - 1\}$$

where $n^{cs}_{SRS} = \{0, 1, 2, 3, 4, 5, 6, 7\}$ is a value configured for each UE by higher-layer parameters and is separately configured by different higher-layer parameters with respect to periodic and aperiodic sounding configurations. $N_{ap}$ denotes the number of antenna ports used for SRS transmission.

Referring to the above-described Equation 4, in DL, an eNB uses the same physical layer cell ID $N^{cell}_{ID}$ with respect to all UEs in generating a UE-specific RS to be transmitted to a specific cell. In a current 3GPP LTE(-A) system, since one UE receives a DL signal only in one cell, the UE needs to know only one $N^{cell}_{ID}$ and one $n_{SCID}$ in order to detect a UE-specific RS thereof. Meanwhile, referring to Equations 8 to 16, UEs positioned in one cell initialize a pseudo-random sequence generator for generating an RS sequence using the same $N^{cell}_{ID}$. In terms of one UE, since the UE transmits a UL signal towards only one cell, the UE uses only one $N^{cell}_{ID}$ to generate a PUSCH DM RS, a PUCCH DM RS, and an SRS. That is, a conventional system, which receives a DL signal in only one cell or transmits a UL signal to only one cell, has used a cell (DL) and UE (UL) based DM RS sequences. In other words, since a DL cell and a UL cell are the same cell and UL/DL transmission is performed in only one cell in the conventional communication system, the UE only needs to acquire $N^{cell}_{ID}$ based on DL synchronization signals (a primary synchronization signal (PSS) and a secondary synchronization signal (SSS)) received from a serving cell and use the acquired $N^{cell}_{ID}$ to generate the UL/DL RS sequence.

However, in a DL CoMP situation, a plurality of cells or transmission points (TPs) may simultaneously participate in DL signal transmission for one UE or may selectively perform DL signal transmission to the UE. For example, one of two TPs may perform DL data transmission (e.g. PDSCH transmission) and the other TP may not perform transmission (in the case of CB/CS or DPS). As another example, both TPs may perform DL data transmission (in the case of JT). In addition, in a UL CoMP situation, one UE may perform UL transmission towards a plurality of cells or reception points (RPs) or perform UL transmission towards some of the cells or RPs. In this case, when a transmitting device transmits an RS sequence generated according to a conventional scheme, the case in which a receiving device cannot detect the RS sequence may occur.

Accordingly, for a CoMP situation in which a plurality of cells or a plurality of TPs/RPs participates in communication with a UE, a method for generating/transmitting DM RSs for data transmitted from/to different points needs to be defined even when the different TPs/RPs do not simultaneously transmit or receive data. One TP may transmit a DL signal to the UE through one or more cells and one RP may receive the DL signal from the UE through one or more cells. However, for convenience of description, the embodiments of the present invention will be described hereinbelow by referring to a cell transmitting a DL signal as a TP and a cell receiving a UL signal as an RP.

When one of two points having different cell IDs selectively transmits data to a UE or the UE selectively transmits data to one of the two points having different cell IDs, a UE-specific (UL or DL) DM RS sequence based on a cell ID designated for each point is generated and transmitted according to the present invention. The UE demodulates PDSCH data received from each point, using DL DM RS sequences received from different points. The UE generates UL DM RS sequences (e.g. PUCCH DM RS sequences, PUSCH DM RS sequences, SRSs, etc.) to be transmitted to different points, based on cell IDs designated for respective points, and transmits the UL DM RS sequences to the corresponding points.

Although the UE may acquire $N^{cell}_{ID}$ of a specific cell using a DL synchronization signal of the specific cell, the UE cannot be aware of $N^{cell}_{ID}$ of cells other than the specific cell. In addition, even though the UE acquires a cell ID of a DL cell using the DL synchronization cell, if a DL cell is different from a UL cell, the UE cannot be aware of a cell ID of the UL cell. Therefore, according to an embodiment of the present invention, an eNB informs the UE, by higher-layer signaling, of a plurality of cell IDs that the UE is to use to generate UL/DL RS sequences. For example, the eNB may semi-statically inform the UE of a plurality of cell IDs and/or a plurality of scrambling IDs configured by RRC signaling and may dynamically inform the UE of an ID to be used at a transmission/reception timing among theses cell IDs, using DCI transmitted through a PDCCH. In DL, the eNB may dynamically indicate a cell ID associated with a PDSCH through the DCI and may transmit a DL DM RS sequence generated using the cell ID to the UE through a corresponding point together with data. The UE may discern, based on the indicated ID, which DL DM RS sequence is to be received. Accordingly, the UE may detect a DL DM RS sequence associated with DL data and demodulate the DL data using the DL DM RS. In UL, the UE may receive an ID to be used to generate a UL RS sequence through DCI, generate the UL RS sequence using the received ID, and transmit the UL RS sequence to the eNB. Since the eNB is aware of an ID used by the UE to generate the UL RS sequence, the eNB can effectively detect the UL RS sequence. The eNB may demodulate, using the UL RS sequence, UCI and/or PDSCH data received from the UE through a corresponding point.

Meanwhile, in CoMP JP and CoMP JR, a point transmitting a DL signal (hereinafter, a DL serving point) may be different from a point receiving a UL signal (hereinafter, a UL serving point). In addition, a plurality of points may participate in DL transmission or in UL reception. Accordingly, a system needs to be designed in consideration of this fact.

In the following, D2D (device to device) communication is explained.

D2D (device to device) communication literally means communication between an electronic device and an electronic device. In a broad sense, the D2D communication means wired or wireless communication between electronic devices or communication between a device controlled by a human and a machine. Yet, recently, the D2D communication generally indicates wireless communication performed between an electronic device and an electronic device without human involvement.

According to a D2D communication scheme or a UE-to-UE communication scheme, data can be exchanged between UEs without passing through a base station. A link directly established between devices can be referred to as a D2D link or a sidelink. The D2D communication has merits in that latency is reduced compared to a legacy base station-centered communication scheme and a less radio resource is required, and the like. In this case, although a UE corresponds to a terminal of a user, if such a network device as an eNB transmits and receives a signal according to a communication scheme between UEs, the network device can be considered as a sort of UEs.

In order to perform D2D communication, it is necessary to obtain time synchronization and frequency synchronization between two UEs. In general, if the two UEs belong to the coverage of an eNB, the two UEs are synchronized by a PSS/SSS, CRS, or the like transmitted by the eNB and the time/frequency synchronization can be maintained between the two UEs in a level that the two UEs are able to directly transmit and receive a signal.

Meanwhile, a D2D transmission signal transmitted through a sidelink can be mainly divided into a discovery use and a communication use. A discovery signal corresponds to a signal used by a UE to determine a plurality of UEs adjacent to the UE. As an example of a sidelink channel for transmitting and receiving the discovery signal, there is a sidelink discovery channel (PSDCH: Physical Sidelink Discovery Channel). A communication signal corresponds to a signal for transmitting general data (e.g., voice, image information, etc.) to be transmitted by a UE. As an example of a sidelink channel for transmitting and receiving the communication signal, there are a physical sidelink broadcast channel (PSBCH), a physical sidelink shared channel (PSSCH), a physical sidelink control channel (PSCCH), and the like.

Figure 13:
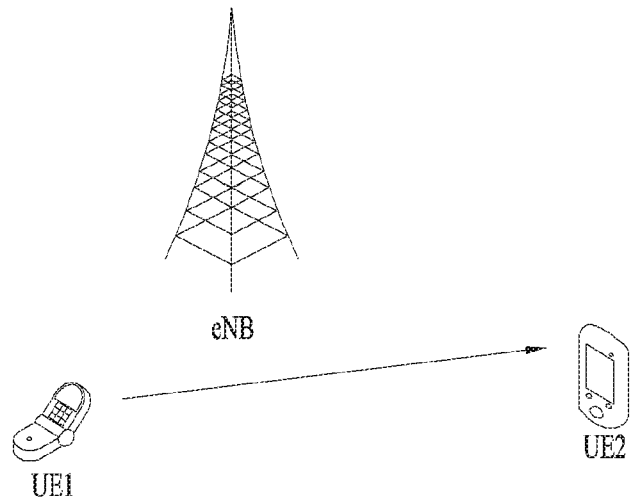
FIG. 13 is a diagram for an example of a D2D resource pool for performing D2D communication.
Figure 13:
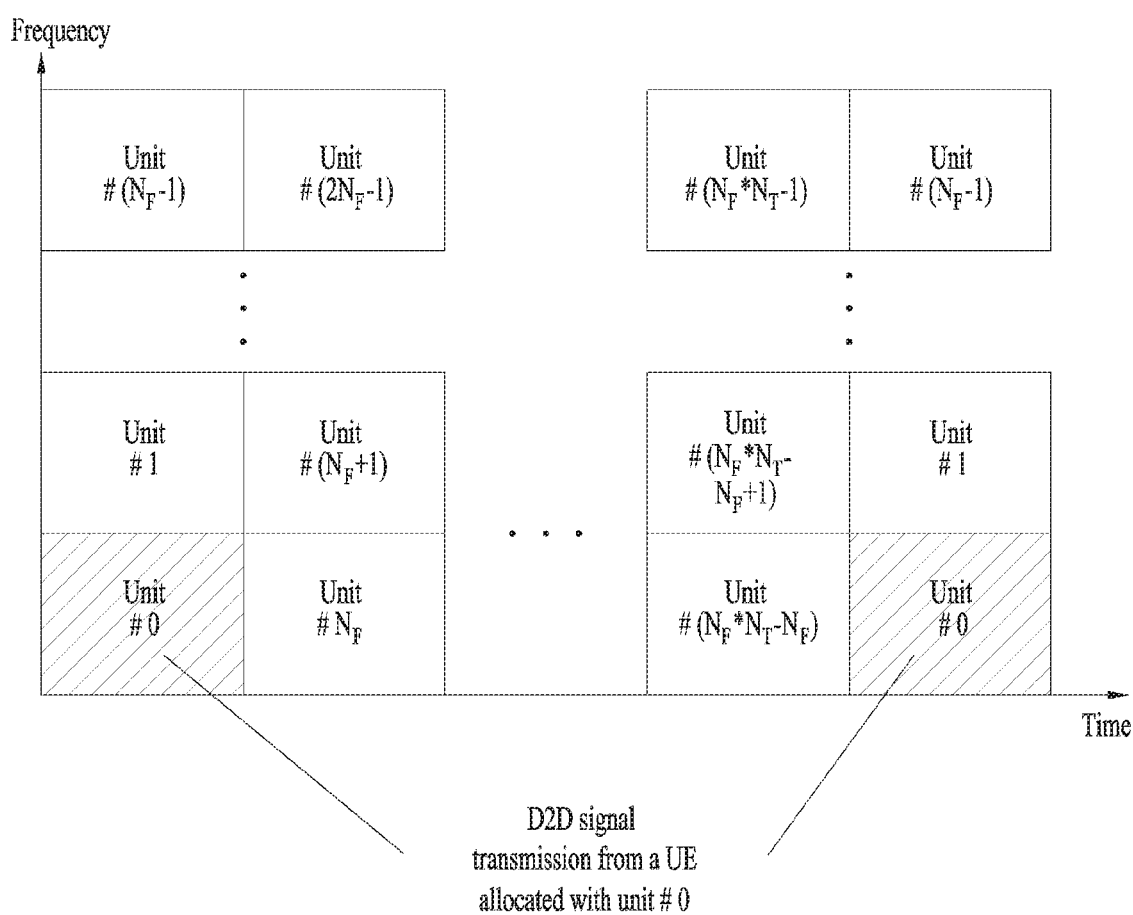

FIG. 13 shows an example of a UE1, a UE2 and a resource pool used by the UE1 and the UE2 performing D2D communication. In FIG. 13 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 13 (b) shows an example of configuring a resource unit. Referring to FIG. 13 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 13, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classiconfigured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

In the following, transmission and reception of SA is explained.

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 14:
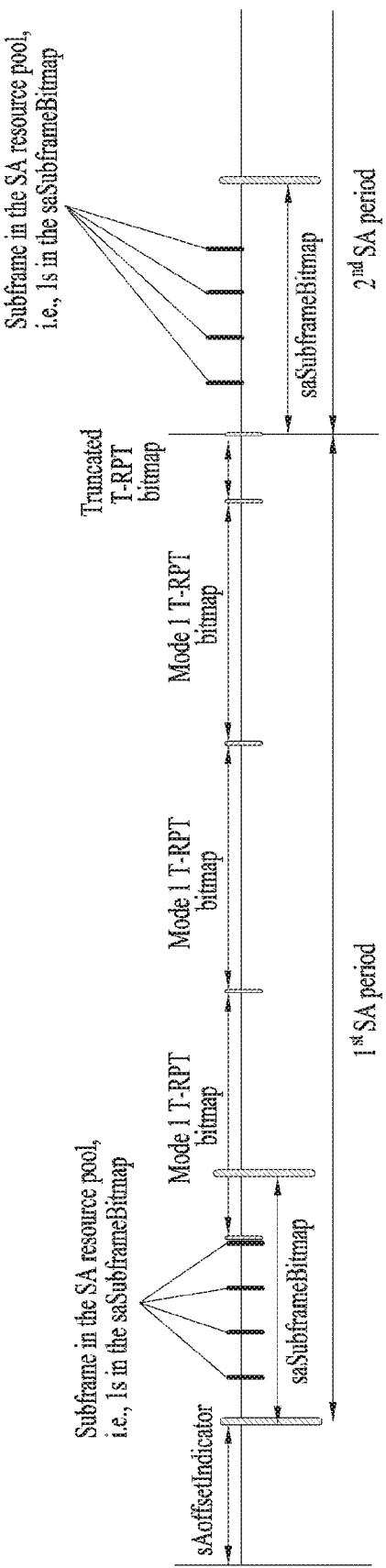
FIG. 14 is a diagram for explaining an SA period.

The SA period can be defined as FIG. 14. Referring to FIG. 14, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. SA may indicate the transmission position of data in the form of T-RPT or using another explicit method. For example, a transmission start position of data, the number of repetitions, etc. may be indicated. More generally, SA is a transmission channel indicating time and frequency positions of transmission resources of data and including supplementary information necessary for data decoding. Such an SA resource pool may be separated from a data pool or may partially overlap a data pool to partially share a data domain. In addition, the data pool and the SA resource pool may not be separated in the time domain but may be separated in the frequency domain.

Meanwhile, V2X communication has been discussed in association with D2D communication. V2X may include V2V between vehicle UEs, V2P between a vehicle and another type of UE, and V2I between a vehicle and a roadside unit (RSU). Hereinafter, embodiments of the present invention of a resource allocation method related to V2X based on the above description will be described. In the following description, a UE may be a vehicle or a UE attached to a vehicle.

Figure 15:
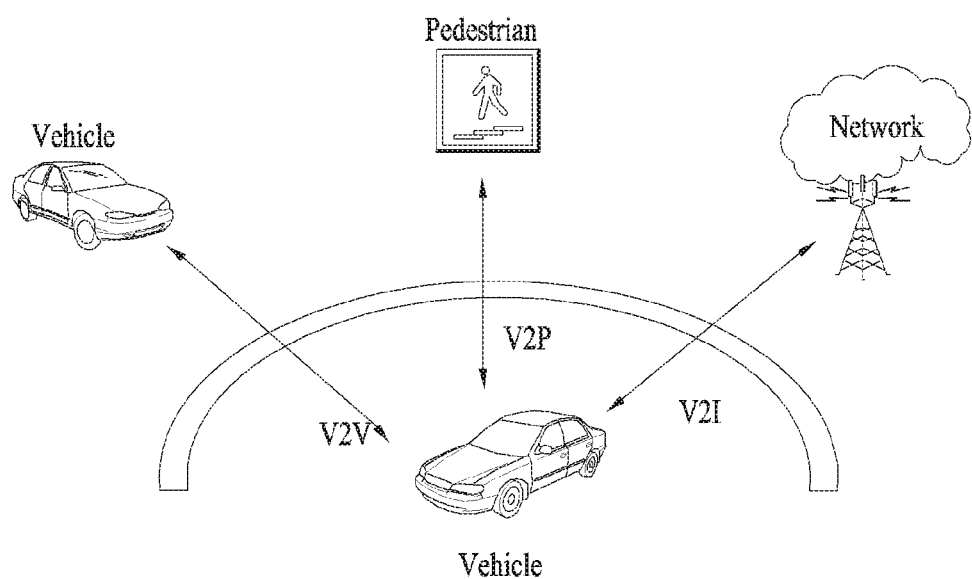
FIG. 15 is a diagram for explaining a V2V scenario.

FIG. 15 is a diagram illustrating V2X (vehicle to everything) communication environment.

If a vehicle accident occurs, many lives are lost and serious property damage is caused. Hence, the demand for a technology capable of securing pedestrian's safety as well as vehicle boarded person's safety is increasingly rising. Hence, a vehicle-specified hardware and software based technology is grafted onto a vehicle.

An LTE based V2X (vehicle-to-everything) communication technology having started from 3GPP reflects the tendency of grafting an IT (information technology) technology onto a vehicle. Connectivity function is applied to some kinds of vehicles, and many efforts are continuously made to research and develop V2V (Vehicle-to-Vehicle) communication, V2I (Vehicle-to-Infrastructure) communication, V2P (Vehicle-to-Pedestrian) communication, and V2N (Vehicle-to-Network) communication through evolution of communication functions.

According to V2X communication, a vehicle consistently broadcasts information on its own locations, speeds, directions, etc. Having received the broadcasted information, a nearby vehicle utilizes the information for accident prevention by recognizing movements of other vehicles moving nearby.

Namely, in a similar manner that an individual person carries a user equipment in shape of a smartphone, a smartwatch or the like, a user equipment (hereinafter abbreviated UE) in specific shape is installed in each vehicle. Here, a UE installed in a vehicle means a device actually provided with a communication service from a communication network. For example, the UE installed in the vehicle can be provided with a communication service by being connected to an eNB.

Yet, various items should be considered for a process for implementing V2X communication in a vehicle. This is because astronomical costs are required for the installation of traffic safety facilities such as V2X base station and the like. Namely, in order to support V2X communication on all vehicle-movable roads, it is necessary to install hundreds or thousands of V2X base stations or more. Moreover, since each network node accesses Internet or a central control server using a wired network basically for stable communication with a server, installation and maintenance costs of the wired network are high.

Meanwhile, in case of performing D2D, it may have a case that load is concentrated on a certain region. For example, similar to V2X communication, communication can be simultaneously performed at specific time and a specific region. In this case, since it is highly probable that a collision occurs between terminals, it is necessary to have a resource selection method more enhanced than a method of randomly selecting a resource in a legacy LTE D2D system. As an enhanced resource selection method, study on a sensing-based resource allocation scheme is in progress.

In the following, the sensing-based resource allocation scheme is explained via various embodiments of the present invention.

In D2D that direct communication is performed between terminals, a transmission UE can autonomously perform resource allocation. In particular, a transmission UE can perform distributed resource allocation to determine an appropriate resource to be used by the transmission UE rather than centralized resource allocation performed by an external device such as a base station to designate a transmission resource of an individual transmission UE. In this case, it is unable to fundamentally prevent a resource collision that two transmission UEs select a duplicated time/frequency resource. Yet, if a resource allocation status of a different UE is appropriately monitored, it may be able to minimize a resource collision. Specifically, a transmission UE determines whether or not a different transmission UE uses a specific time/frequency resource. If it is determined as the different transmission UE use the specific time/frequency resource, the transmission UE may not select the specific time/frequency resource. In particular, an operation of determining whether or not a different UE uses a specific resource is referred to as carrier sensing or resource sensing. In this case, the time/frequency resource may correspond to a time resource, a frequency resource, or a time and frequency resource.

A UE performs resource sensing for prescribed time before a message is transmitted between UEs (e.g., vehicles). If it is determined as a resource is not used by a different UE, the UE performs sensing-based resource allocation in the resource to maintain resource selection for prescribed time. By doing so, neighboring UEs can stably perform an interference measurement operation and a resource collision probability can be reduced. In particular, it is able to efficiently perform resource selection.

The present invention proposes a resource sensing method appropriate for D2D communication.

Figure 16:
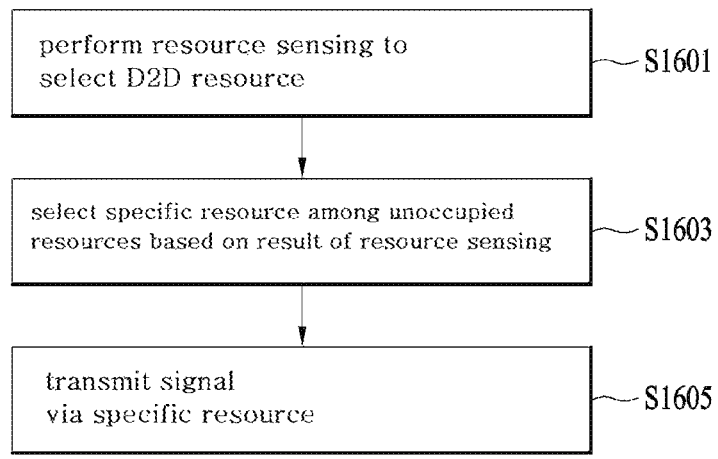
FIG. 16 is a flowchart for a method of selecting a resource based on resource sensing according to one embodiment of the present invention.

In the following, an example of selecting a resource based on resource sensing is explained with reference to FIG. 16. In FIG. 16, assume a case that a specific resource is not occupied by a different UE based on resource sensing.

In this case, a section corresponding to a target of the resource sensing is referred to as a resource discovery section and a section anticipated to be used is referred to as a transmission section. The resource discovery section and the transmission section may correspond to sections separated from each other with a specific time interval. In this case, the specific time interval may correspond to a subframe unit, a time unit of the resource unit, or a slot unit.

In the step S1601, a UE performs resource sensing to select a D2D resource. In this case, the resource sensing is performed on the resource discovery section. If the resource sensing is performed, the UE can identify unoccupied resources not occupied by a different UE or unoccupied resources anticipated as not occupied by the different UE. In the step S1603, the UE selects a specific resource from among the unoccupied resources based on a result of the resource sensing. In this case, the specific resource can be randomly selected or can be selected from among resource units having a low interference level. In the step S1605, the UE can transmit a signal via the selected specific resource.

In the following, a specific principle of the resource sensing-based resource selection method performed in the present invention is explained.

First of all, a signal on which resource sensing is performed is explained. Basically, the resource sensing can be executed according to a resource unit. In some cases, the resource sensing can be performed on a specific resource unit, e.g., a resource unit for SA transmitting a control signal only. In particular, if the resource sensing is performed on a specific resource unit only, since a signal format of SA becomes limitative, it may be able to simplify an operation of a UE.

As described in the following, the resource sensing can also be performed based on received energy or specific reference signal reception power.

First of all, the resource sensing can be performed based on received energy (or, power). According to the first method, a UE performs the resource sensing based on energy or power measured at each resource unit. In this case, if the received energy is equal to or greater than a prescribed level or a specific threshold value, it can be considered as a corresponding resource unit is occupied by a different UE.

Second, the resource sensing can be performed based on DMRS reception power. A UE measures reception power of a specific DMRS at each resource unit and performs the resource sensing based on the measured reception power. In this case, if the DMRS reception power is equal to or greater than a prescribed level, it can be considered as a corresponding resource unit is occupied by a different UE.

In this case, a measurement value of reception power may correspond to an RSRP value for example. If DMRS reception power-based resource sensing is performed on an SA resource unit, it can be comprehended as resource sensing is performed based on SA and reception power.

When a resource is selected based on resource sensing, since it is to anticipate a resource status of the future based on a current resource status, the resource selection can be performed under the assumption that occupation of the resource occupied by a UE is maintained for a prescribed time section. For example, a UE may anticipate an occupied state of a resource to be used in the future based on SA decoding and/or reception power and the UE may operate under the assumption that the occupied state is maintained for prescribed time. In case of the SA decoding, a UE may operate under the assumption that resource allocation information indicated by the SA and/or a parameter related to transmission are maintained for the resource to be used in the future for prescribed time.

In the following, the resource sensing is explained in more detail by assuming that the resource sensing is performed based on DMRS reception power. If the resource sensing is performed based on the DMRS reception power, it may have a merit in that UEs different from each other can perform signal transmission with a different DMRS using the same time/frequency resource. In the following, although it is assumed that a DMRS of D2D and a DMRS of PUSCH are generated using the same principle, it is apparent that a case of using a separate DMRS also belongs to the scope of the present invention.

If transmission UEs different from each other transmit a signal using the same time/frequency, it is preferable that DMRS sequences used by the transmission UEs are different from each other. If two messages each of which has a different DMRS are transmitted using the same time/frequency, a reception UE equipped with a plurality of antennas may receive both of the two messages via MU-MIMO effect according to a channel state with transmission UEs. Or, the reception UE may receive a message of bigger reception power among the two messages including a different DMRS. When reception power of one message is relatively bigger than reception power of another message, if DMRSs are the same, since it is difficult to distinguish one reference signal from another reference signal between the two messages, channel estimation performance can be deteriorated. Yet, if DMRSs are different from each other, since it is able to consider a message of small reception power as interference in the overall reception operation ranging from channel estimation to message decoding, it is highly probable that a message of big reception power is to be successfully received.

In order to obtain the abovementioned effect, it may define a plurality of DMRS sequences to be used in a single resource unit. Specifically, when a transmission UE selects a specific resource unit, a plurality of DMRS sequences rather than a single DMRS sequence can be used in the resource unit. The transmission UE selects one sequence from among a plurality of the DMRS sequences via an appropriate procedure and may be then able to perform a transmission operation.

In this case, when a UE performs resource sensing in the specific resource unit, it is necessary for the UE to perform the resource sensing on a DMRS sequence capable of being used in the resource unit. And, whether or not a different UE occupies a resource may vary depending on a target DMRS sequence. Specifically, if a DMRS sequence is determined according to a CS (cyclic shift) value $\lambda$, a different UE may exist under the condition of $\lambda=0$. On the other hand, if $\lambda=1$ is satisfied, a different UE may exist. If reception power of a DMRS sequence is equal to or greater than a certain level, a UE performing the resource sensing may assume that a different UE using the DMRS sequence exists. In this case, as an example of the DMRS sequence capable of being used in a corresponding resource unit, there is a DMRS sequence identified by SA decoding. Or, it may perform the resource sensing according to a DMRS sequence based on blind detection.

Whether or not a different UE exist in a resource can be identified after the resource sensing is completed. A UE randomly selects a resource from among resources in which a different UE does not exist or selects a resource unit of a lower interference level to transmit a signal of the UE.

Meanwhile, when a UE intends to perform transmission, a case of using a resource unit previously occupied by a different UE may occur. In this case, the UE may perform one of the following operations. The operations can be set to the UE in advance or the UE may select one of the operations.

In this case, although a resource unit is occupied by a different UE, the resource unit can be used in the following situations. If reception power or DMRS reception power is equal to or greater than a threshold value in all resource units, a resource unit occupied by a different UE can be used. Moreover, although all resource units are not occupied, if unoccupied resources necessary for performing transmission of a UE do not exist, a resource unit occupied by a different UE can be used. For example, when a UE intends to transmit a signal using a resource unit of a size of 20 RBs, if several resource units are occupied by a different UE, since only RBs smaller than 20 RBs are unoccupied, the resource units occupied by the different UE can be used. Or, when a UE uses a resource, if it is necessary for the UE to follow a prescribed restriction, unoccupied resources of a size necessary for performing transmission of the UE and satisfying the restriction may not exist. As an example of the restriction, transmission resources should be contiguous in frequency domain to maintain single carrier property of a UE signal. Or, when a resource to be used by a UE in the future is designated, if resource sensing determines that the resource is occupied by a different UE, the resource can be used by the UE.

As an operation, a UE may postpone transmission start time until different time. This operation is advantageous in that additional interference does not occur. Yet, it has a demerit in that transmission time is delayed. This operation is suitable for a message of a relatively low priority and/or a message that a remaining acceptable time delay is relatively long. In particular, this operation is suitable for a message that satisfies a requirement for time delay although the message is transmitted at next transmission timing.

As a different operation, it may start transmission using a DMRS sequence not used by a second UE in a resource unit occupied by the second UE. In this case, it is preferable to use a sequence less correlated with a DMRS sequence used by the second UE. For example, when the total N number of CSs of a DMRS sequence is used, a sequence of a first UE may correspond to a DMRS sequence corresponding to (x+a) mod N. In this case, x may correspond to a CS value of the DMRS sequence of the second UE. And, a is a value corresponding to a distance or a difference of the CS value. The a may correspond to the biggest distance or the biggest difference. For example, similar to a PUSCH DMRS, when 12 CS values are used in total, if a DMRS of which a CS value corresponds to x is detected, it may use a DMRS corresponding to (x+6) mod 11 to use the least correlated CS value. Although this operation causes additional interference, it may have a merit in that immediate transmission is available. This operation is suitable for a message of a relatively high priority and/or a message that a remaining acceptable time delay is relatively short. In particular, this operation is suitable for a message that does not satisfy a requirement for time delay when the message is transmitted at next transmission timing. In this case, it is preferable to select a resource unit occupied by the less number of UEs or a resource unit of less reception power.

Figure 17:
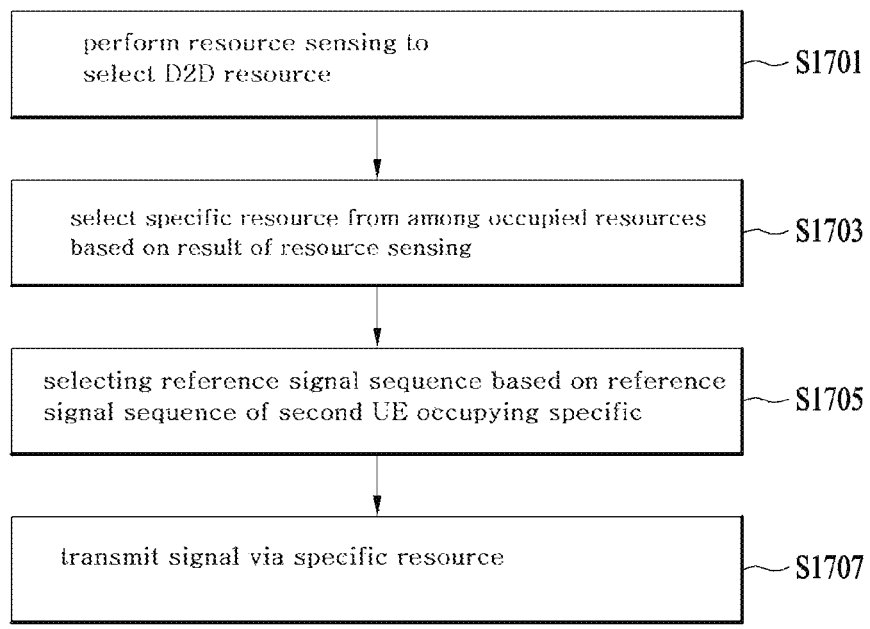
FIG. 17 is a flowchart for a method of selecting a resource based on resource sensing according to a different embodiment of the present invention.

FIG. 17 is a flowchart for a method of selecting a resource based on resource sensing according to a different embodiment of the present invention. In FIG. 17, assume a case that all resource units are occupied by a different UE at transmission timing. The aforementioned principle of the resource sensing can be applied to each of operations described in the following.

Referring to FIG. 17, in the step S1701, a first UE performs resource sensing. In this case, the resource sensing can be performed on the resource discovery section. And, the resource sensing can be performed according to the aforementioned principle. For example, the resource sensing can be performed by measuring DMRS-based reception power on a resource unit for SA. In this case, the first UE may determine that all resource units are occupied by a different UE at transmission timing.

In the step S1703, the first UE can select a specific resource from among the resources occupied by different UEs based on a result of the resource sensing. In this case, the specific resource may correspond to a resource unit occupied by the less number of UEs or a resource unit at which less reception power is sensed. In the following, a different UE occupying the specific resource is referred to as a second UE.

In the step S1705, the first UE can select a reference signal sequence based on a reference signal sequence of the second UE occupying the specific resource. In the step S1707, the first UE can transmit a signal to a counterpart UE using the reference signal sequence. In this case, as mentioned in the foregoing description, the reference signal sequence may correspond to a DMRS sequence.

If unoccupied resources capable of being used by a UE are not sufficient compared to a size of a signal to be transmitted by the UE, an operation described in the following can be performed. In case of a PUSCH DMRS, a size of a DMRS sequence selected by the UE can be determined according to a size of a resource in which a signal is transmitted. In this case, if a size of a resource occupied by the second UE is different from a size of a resource occupied by the first UE, each of DMRSs has a different sequence.

As a different example, it may perform an operation described in the following by assuming a case that a resource to be used by the first UE in the future has already been designated. Although a resource to be used by the first UE is designated, the resource is determined as being occupied by the second UE via resource sensing. If a DMRS sequence of the first UE (hereinafter, a first DMRS sequence) is also designated to the resource, the first DMRS sequence can be changed with a different sequence in consideration of a second DMRS sequence of the second UE. Of course, if the DMRS sequence of the first UE is less correlated with the sequence of the second UE, it may use the designated sequence as it is. If the DMRS sequence of the first UE is not designated, it may use a sequence least correlated with the DMRS sequence of the second UE.

Meanwhile, if a UE performs resource sensing using a plurality of DMRSs in a single resource unit, it may excessively increase implementation complexity of the UE. In this case, it may be able to define a single DMRS to be used in a single resource unit. Yet, if a different DMRS is used in a duplicated unit, it may lower resource sensing complexity of the UE and obtain an effect according to the DMRS sequence distinction.

Figure 18:
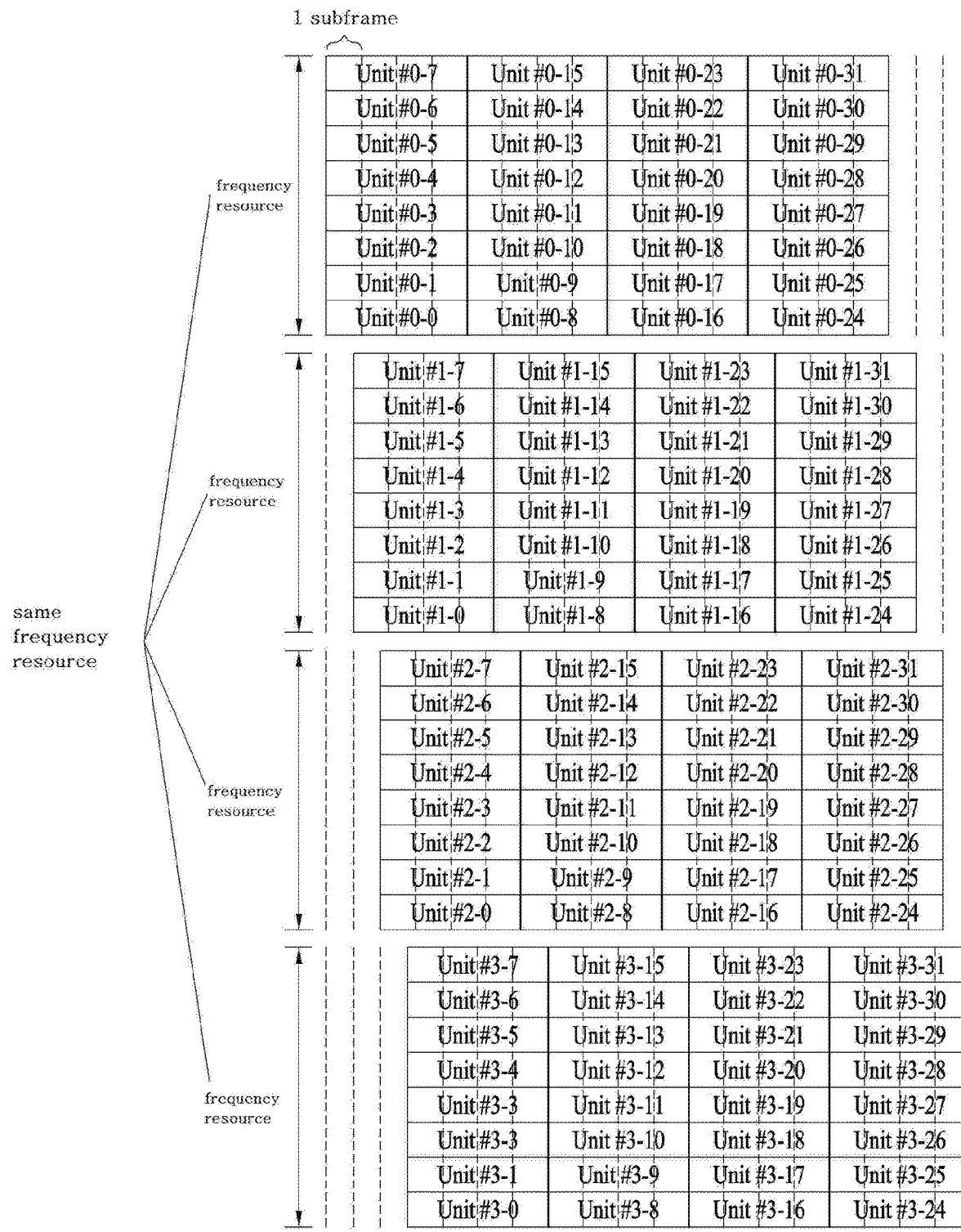
FIG. 18 illustrates a resource structure to which a further different embodiment of the present invention is applicable.

FIG. 18 illustrates a resource structure to which one embodiment of the present invention is applicable.

In FIG. 18, assume that a DMRS is used in a single resource unit. Referring to FIG. 18, one unit includes 4 contiguous subframes and the entire frequency is divided into 8 units. Yet, an operation according to the present invention can also be applied to a case that subframes included in a single unit are separated from each other. And, since a unit #X-Y is shifted as much as X subframe, a unit is configured to start at a random subframe. As a result, a part of units is overlapped in time/frequency.

In this case, assume that a UE performs resource sensing in a first subframe of each unit in the aforementioned resource structure. An example of selecting a resource under the assumption is explained in the following. For example, the UE may sense a resource #X-Y in a subframe #X and may be then able to determine a resource unit to be used from a subframe #(X+1).

According to the aforementioned resource structure, a resource #X-Y (e.g., a resource unit #0-7 in FIG. 18) and a resource #(X+1)-Y (e.g., a resource unit #1-7 in FIG. 18) are partly overlapped with each other. In this case, if the UE determines a different DMRS sequence used in a corresponding resource, the resources can be distinguished from each other in terms of an RS.

As a method for implementing the abovementioned operation, a DMRS sequence used in a unit can be determined from a subframe index at which the unit starts. Yet, if a DMRS sequence used by a UE changes in a unit over time, since a correlation property between RS sequences is not maintained, a determined sequence can be continuously used in a unit.

In order to more flexibly apply the abovementioned operation, it may be able to configure the number of subframes constructing a single unit to be flexible. For example, while control information is transmitted using a partial resource of a unit, a length of the unit can be dynamically designated using the control information. In this case, if the control information is transmitted to a start point of the unit having a flexible length, it may be able to determine a DMRS sequence based on a position to which the control information is transmitted.

As mentioned in the foregoing description, if a DMRS sequence is differently used, it may also be able to differently use a scrambling sequence of a codeword according to a UE to randomize interference in a dimension of a message.

A part of the aforementioned principle of the present invention can be used irrespective of whether or not resource sensing is applied. For example, it may be able to configure a specific DMRS sequence to be used by a message of a relatively high priority and/or a message that remaining acceptable time delay is relatively short only. By doing so, although a collision occurs with a message of a relatively low priority and/or a message that remaining acceptable time delay is relatively long in a corresponding resource, a UE can perform decoding. Of course, in order to more increase decoding capability, it may be able to configure power of the message of a relatively high priority and/or power of the message that remaining acceptable time delay is relatively short to have a higher value. For example, it may apply an additional power offset to transmit power.

Or, if partially overlapped units or units having a different start point use a different DMRS sequence, two UEs using the partially overlapped units can distinguish one unit from another unit using the different DMRS sequence.

Figure 19:
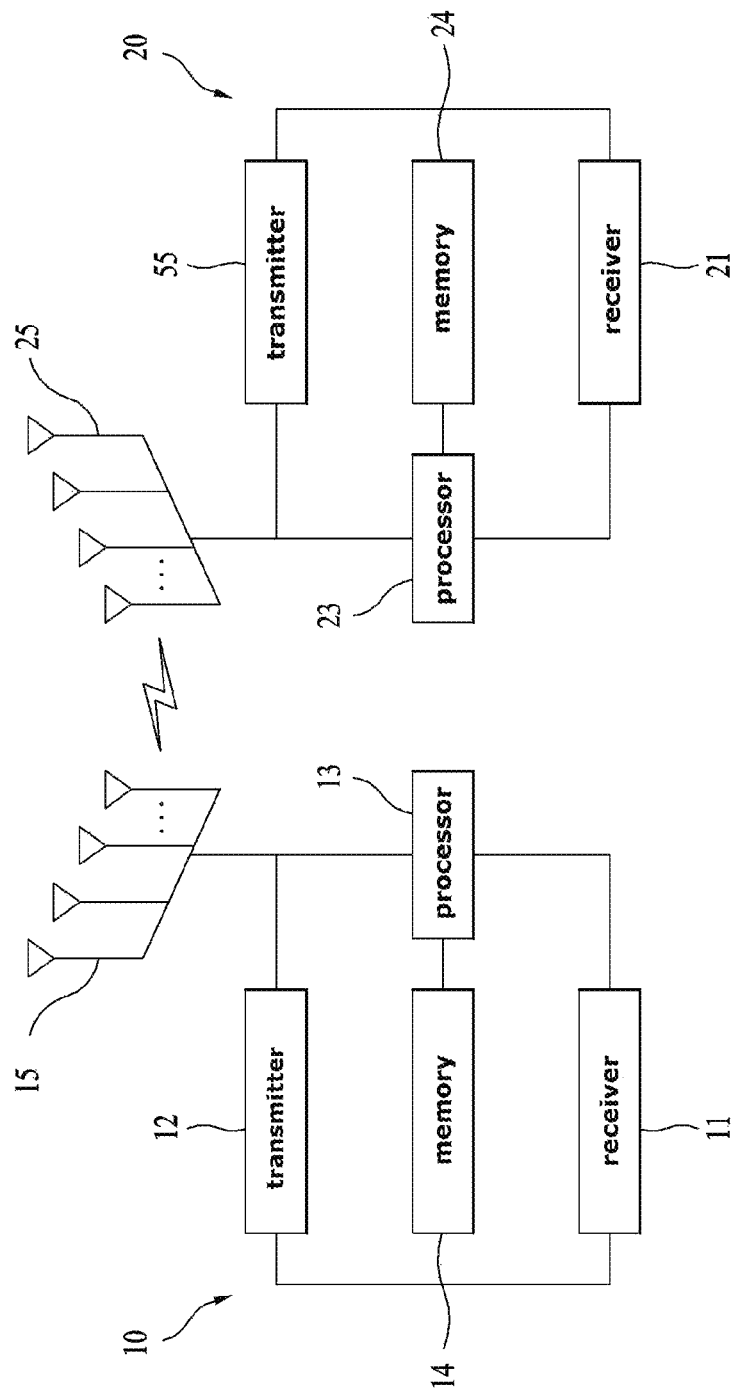
FIG. 19 is a diagram showing the configuration of a transmission and reception device.

FIG. 19 is a diagram showing the configuration of a transmission point device and a UE device.

Referring to FIG. 19, the transmission point device 10 according to the present invention may include a reception module 11, a transmission module 12, a processor 13, a memory 14 and a plurality of antennas 15. Since the plurality of antennas 15 is used, the transmission point device may support MIMO transmission/reception. The reception module 11 may receive a variety of signals, data and information from the UE on uplink. The transmission module 12 may transmit a variety of signals, data and information to the UE on downlink. The processor 13 may control the overall operation of the transmission point device 10.

The processor 13 of the transmission point device 10 according to one embodiment of the present invention may process operations necessary for the above-described embodiments.

The processor 13 of the transmission point device 10 may process information received by the transmission point device 10 and information to be transmitted to an external device and the memory 14 may store the processed information for a predetermined time and may be replaced by a component such as a buffer (not shown).

Referring to FIG. 19, the UE device 20 according to the present invention may include a reception module 21, a transmission module 22, a processor 23, a memory 24 and a plurality of antennas 25. Since the plurality of antennas 25 is used, the UE device may support MIMO transmission/reception. The reception module 25 may receive a variety of signals, data and information from the eNB on downlink. The transmission module 22 may transmit a variety of signals, data and information to the eNB on uplink. The processor 23 may control the overall operation of the UE device 20.

The processor 23 of the UE device 20 according to one embodiment of the present invention may process operations necessary for the above-described embodiments.

The processor 23 of the UE device 20 may process information received by the UE device 20 and information to be transmitted to an external device and the memory 24 may store the processed information for a predetermined time and may be replaced by a component such as a buffer (not shown).

In the above-described detailed configuration of the transmission point device and the UE device, details of the above-described various embodiments of the present invention may be independently applied or 2 or more embodiments may be applied at the same time. In this case, overlapping details will be omitted from the description for simplicity and clarity.

Furthermore, in the description of FIG. 13, the description of the transmission point device 10 may also be equally applied to a device functioning as a downlink transmitter or an uplink receiver. The description of the UE device 20 may also be equally applied to a relay station device functioning as an uplink transmitter or a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

What is claimed is:

1. A method of transmitting a signal, by a first user equipment (UE) between UEs in a wireless communication system, the method comprising:
   performing resource sensing on a resource discovery region including a plurality of resource units occupied by a second UE;
   selecting a specific resource unit, among the plurality of resource units, based on a result of the resource sensing; and
   transmitting the signal via the specific resource unit at a first transmission point or a second transmission point,
   wherein the second transmission point is a delayed transmission point after the first transmission point,
   wherein whether the signal is transmitted at the first transmission point or the second transmission point is based on whether a latency requirement for the signal is satisfied at the second transmission point,
   wherein when the latency requirement is satisfied, the signal is transmitted at the second transmission point,
   wherein when the latency requirement is not satisfied:
      the signal is transmitted at the first transmission point based on a first reference signal sequence in the specific resource unit,
      a first cyclic shift value for the first reference signal sequence is a cyclic shift value, among a plurality of cyclic shift values, having a lowest correlation with a second cyclic shift value for a second reference signal sequence of the second UE, the configured first reference signal sequence and the configured second reference signal sequence are not changed in the specific resource unit, and a number of subframes configuring the specific resource unit for transmitting the signal is dynamically configured based on control information, the control information being received via a start point of the specific resource unit, wherein a first transmission power to be allocated for the signal when the signal is transmitted at the first transmission point is configured to be greater than a second transmission power to be allocated for the signal when the signal is transmitted at the second transmission point, based on an additional power offset, and wherein the additional power offset is applied to the first transmission power based on that the latency requirement is not satisfied for the signal transmitted at the first transmission point.

2. The method of claim 1, wherein the specific resource unit is positioned after the resource discovery region in a time unit.

3. The method of claim 1, wherein the first reference signal sequence and the second reference signal sequence are a demodulation reference signal sequence.

4. The method of claim 1, wherein the resource sensing is performed on a resource unit used for scheduling assignment.

5. The method of claim 1, wherein the specific resource unit has smallest reception power among the plurality of resource units occupied by the second UE.

6. A first user equipment (UE) transmitting a signal between UEs in a wireless communication system, the first UE comprising:

a transceiver configured to transmit and receive a signal between UEs; and at least one processor connected with the transceiver, and configured to:

perform resource sensing on a resource discovery region including a plurality of resource units occupied by a second UE, select a specific resource unit, among the plurality of resource units, based on a result of the resource sensing, transmit the signal based on a first reference signal sequence via the specific resource unit, wherein the second transmission point is a delayed transmission point after the first transmission point, wherein whether the signal is transmitted at the first transmission point or the second transmission point is based on whether a latency requirement for the signal is satisfied at the second transmission point, wherein when the latency requirement is satisfied, the signal is transmitted at the second transmission point, wherein when the latency requirement is not satisfied:

the signal is transmitted at the first transmission point based on a first reference signal sequence in the specific resource unit, a first cyclic shift value for the first reference signal sequence is a cyclic shift value, among a plurality of cyclic shift values, having a lowest correlation with a second cyclic shift value for a second reference signal sequence of the second UE, the configured first reference signal sequence and the configured second reference signal sequence are not changed in the specific resource unit, and a number of subframes configuring the specific resource unit for transmitting the signal is dynamically configured based on control information, the control information being received via a start point of the specific resource unit, wherein a first transmission power to be allocated for the signal when the signal is transmitted at the first transmission point is configured to be greater than a second transmission power to be allocated for the signal when the signal is transmitted at the second transmission point, based on an additional power offset, and wherein the additional power offset is applied to the first transmission power based on that the latency requirement is not satisfied for the signal transmitted at the first transmission point.

7. The first UE of claim 6, wherein the specific resource unit is positioned after the resource discovery region in a time unit.

8. The first UE of claim 6, wherein the first reference signal sequence and the second reference signal sequence are a demodulation reference signal sequence.

9. The first UE of claim 6, wherein the resource sensing is performed on a resource unit used for scheduling assignment.

10. The first UE of claim 6, wherein the specific resource unit has smallest reception power among the plurality of resource units occupied by a second UE.

* * * * *